(12) United States Patent
Kamen et al.

(10) Patent No.: US 10,556,513 B2
(45) Date of Patent: Feb. 11, 2020

(54) SYSTEMS, METHODS AND APPARATUS FOR VEHICLE BATTERY CHARGING

(71) Applicant: DEKA Products Limited Partnership, Manchester, NH (US)

(72) Inventors: Dean Kamen, Bedford, NH (US); Richard K. Heinzmann, Francestown, NH (US); Jason M. Sachs, Chandler, AZ (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 15/137,454

(22) Filed: Apr. 25, 2016

(65) Prior Publication Data

US 2016/0236583 A1 Aug. 18, 2016

Related U.S. Application Data

(63) Continuation of application No. 14/511,460, filed on Oct. 10, 2014, now Pat. No. 9,321,361, which is a continuation of application No. 12/847,354, filed on Jul. 30, 2010, now Pat. No. 8,860,362.

(60) Provisional application No. 61/230,210, filed on Jul. 31, 2009.

(51) Int. Cl.
*B60L 11/18* (2006.01)
*B60L 8/00* (2006.01)
*G06Q 30/08* (2012.01)
*G07F 15/00* (2006.01)
*H02J 7/00* (2006.01)

(52) U.S. Cl.
CPC .......... *B60L 11/1842* (2013.01); *B60L 8/003* (2013.01); *G06Q 30/08* (2013.01); *G07F 15/003* (2013.01); *H02J 7/0027* (2013.01); *H02J 7/0054* (2013.01); *B60L 2200/26* (2013.01); *B60L 2240/80* (2013.01); *B60L 2250/16* (2013.01); *H02J 7/0055* (2013.01); *H02J 2007/0001* (2013.01); *Y02T 10/7055* (2013.01); *Y02T 10/7083* (2013.01)

(58) Field of Classification Search
CPC .. B60L 11/1842; B60L 11/1816; H02J 7/0054
USPC ........................................ 320/109
See application file for complete search history.

(56) References Cited

U.S. PATENT DOCUMENTS 7,956,570 B2 * 6/2011 Lowenthal .......... B60L 11/1816
320/104

* cited by examiner

*Primary Examiner* — Richard V Muralidar
(74) *Attorney, Agent, or Firm* — Michelle Saquet Temple

(57) ABSTRACT

A system for charging a battery within an at least partially electric vehicle. The system includes a charging device wherein the charging device configured to electrically connect to the at least partially electric vehicle and charge at least one battery by a predetermined amount. The system also includes a network configured to determine the location of the charging device.

13 Claims, 14 Drawing Sheets

SYSTEMS, METHODS AND APPARATUS FOR VEHICLE BATTERY CHARGING

CROSS REFERENCE TO RELATED APPLICATIONS

The present application is a Continuation application of U.S. patent application Ser. No. 14/511,460, filed Oct. 10, 2014 and entitled Systems, Methods and Apparatus for Vehicle Battery Charging, now U.S. Pat. No. 9,321,361, issued Apr. 26, 2016, which is a Continuation application of U.S. patent application Ser. No. 12/847,354, filed Jul. 30, 2010 and entitled Systems, Methods and Apparatus for Vehicle Battery Charging, now U.S. Pat. No. 8,860,362, issued Oct. 14, 2014 which is a Non-Provisional application which claims the benefit of U.S. Provisional Patent Application Ser. No. 61/230,210, filed Jul. 31, 2009 and entitled Method, System and Apparatus for Vehicle Battery Charging, both of which are hereby incorporated herein by reference in their entireties.

TECHNICAL FIELD

The present disclosure relates to one or more vehicle battery and more particularly, to systems, methods, and apparatus for vehicle battery charging.

BACKGROUND INFORMATION

Various devices and/or vehicles are powered by at least one battery. In some cases, the at least one battery is a battery capable of being recharged, sometimes referred to as a rechargeable battery. There are various methods and devices that may be used to recharge a battery. However, many of these methods and devices require access to a particular connector which, in many cases, is electrically connected to a grid or power source. Further, many of these devices require a specific connector which may not be universal. With respect to at least partially electric vehicles, recharging may be difficult for the at least one battery may require a recharge in a location where a recharging device is not available.

Accordingly, there is a need for a system, method and apparatus for recharging and/or providing charge to at least one battery on an at least partially electric vehicle, which is available at the location in which the charge is desired.

SUMMARY

In accordance with one aspect of the present invention, a system for charging a battery within an at least partially electric vehicle is disclosed. The system includes a charging device wherein the charging device configured to electrically connect to the at least partially electric vehicle and charge at least one battery by a predetermined amount. The system also includes a network configured to determine the location of the charging device.

Some embodiments of this aspect of the present invention include one or more of the following: wherein the network is configured for communication between the electric vehicle and the network and the network and the charging device; wherein the network configured to send and receive communication from a central database; wherein the electric vehicle requests a charge from the charging device through communication with the network; wherein the charging device is a mobile charging device; wherein the charging device comprising at least one battery; wherein the electric potential of the energy in the charging device is greater than the electric potential of the battery in the electric vehicle; wherein the at least one battery in the charging device is charged by a generator; wherein the generator is a Stirling generator; and/or wherein the charging device is a vehicle.

In accordance with one aspect of the present invention, a battery charge system for an electric vehicle, the electric vehicle comprising at least one electric vehicle battery, is disclosed. The system includes a charging device comprising at least one charging device battery configured to charge at least one electric vehicle battery of the at least partially electric vehicle, a network in communication with the charging device, and a communication device communicatively coupled to the charging device and configured to receive charging requests from the network.

Some embodiments of this aspect of the present invention include one or more of the following: wherein the charging device is a charging vehicle; wherein the charging vehicle is a mobile charging vehicle; wherein the at least one battery is a low impedance battery having a higher potential than a battery in the electric vehicle; and/or wherein the electric vehicle comprising a communication device communicatively coupled to the network.

In accordance with one aspect of the present invention, a system for charging a vehicle is disclosed. The system includes a charging device. The charging device electrically connects to an at least partially electric vehicle and recharges a battery by a predetermined amount. The system also includes a system for locating the charging device.

Some embodiments of this aspect of the present invention include one or more of the following: where the charging device is connected to a vehicle; where the charging device is stationary; where the charging device is charged by a generator; where the charging device is charged by a Stirling generator.

These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Definitions

Figure 1:
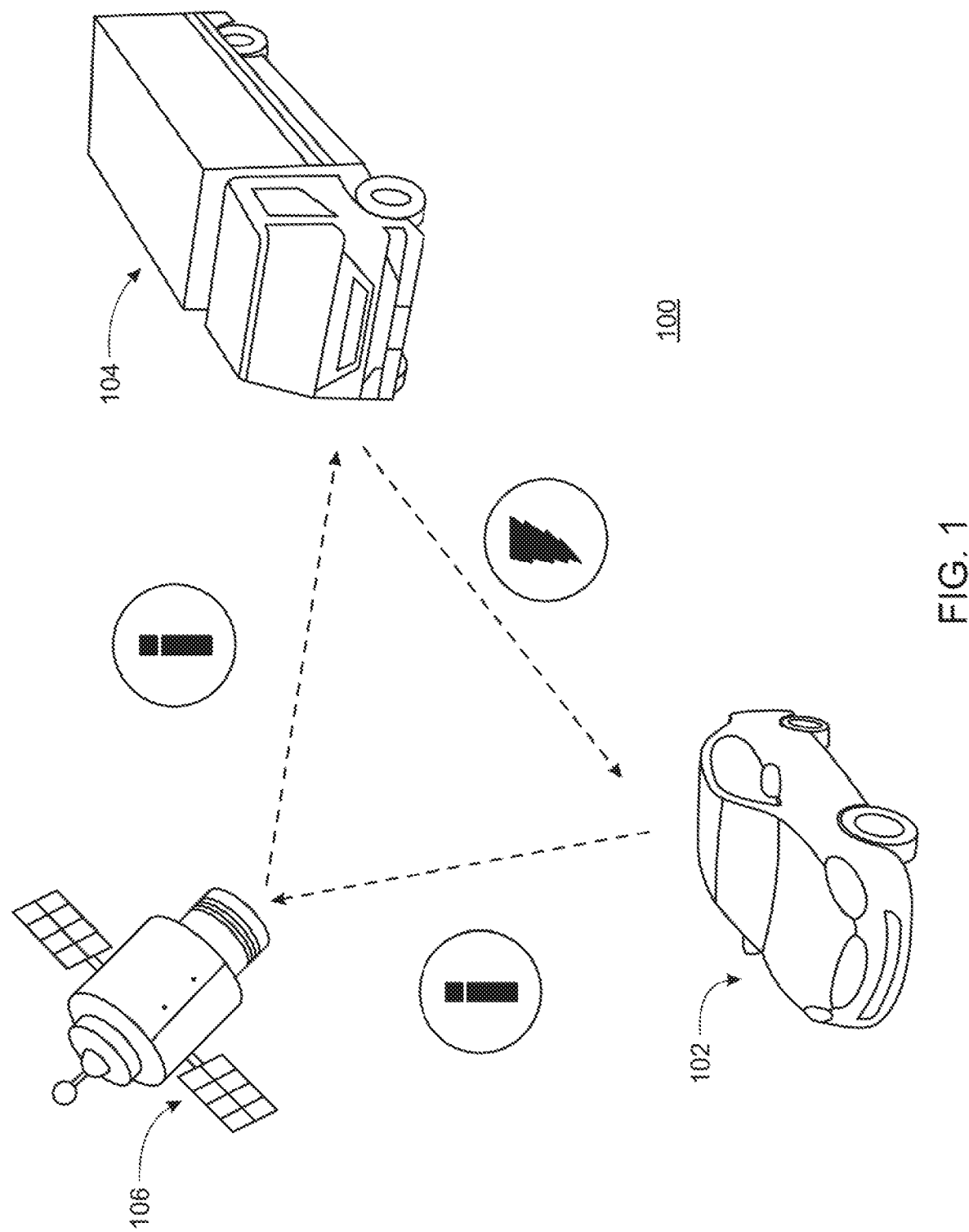
FIG. 1 is an illustration of a system for charging electric vehicles consistent with some embodiments of the present disclosure.

As used in this description, drawings, and the accompanying claims, the following terms shall have the meanings indicated, unless the context otherwise requires:

A "vehicle" may include any means in or by which someone travels or something is carried or conveyed, or a conveyance moving on wheels, runners, tracks, treads, skis, arcuate elements, ground-contacting members, or the like. A vehicle may also include a watercraft, an aircraft or anything that is supported for flight in the air by buoyancy or by the dynamic action of air on its surfaces. A vehicle may also be propelled or pulled by something or someone.

A "charging vehicle" may be any type of vehicle capable of providing energy.

A "charging device" or "charging station" may be stationary, parked, mobile (such as a portable trailer or a pod), wireless, i.e., inductively coupled, or through a microwave laser beam, charged particle beams, or any other apparatus or device capable of providing energy. In some embodiments, the "charging" may take place while the vehicle is in motion, e.g., at highway speeds. A "charging device" may work identical to or similar to a "charging vehicle." Throughout the disclosure, "charging device," "charging station," and "pod" are used interchangeably.

An "electric vehicle" may be any type of vehicle at least partially reliant on at least one battery to power at least part and/or a portion of the vehicle. For example, an electric vehicle may include, but is not limited to, one or more of the following: an electric car, electric truck, or a hybrid car or hybrid truck.

A "database" may include a collection of information from which a computer program may select a desired piece of data. More specifically, a database may include any type of system for storing data in volatile and/or non-volatile storage. This includes, but is not limited to, systems based upon magnetic, optical, and magneto-optical storage devices, storage devices based on flash memory and/or battery-backed up memory, random access memory (including dynamic random access memory and static random access memory), content addressable memory, and/or dual-ported RAM. As used herein, database may be used in conjunction with or interchangeably with network, system, processor, or any other combination of hardware and/or software to achieve tasks such as, but not limited to, contacting a user or vehicle, communicating with a user or vehicle, communicating with a utility company, communicating with a parking garage, communicating with a Global Positioning Satellite, purchasing electricity, receiving and sending payments, and the like. Throughout the disclosure, "database" and "central database" are used interchangeably.

A "network" may include a series of points or nodes interconnected by communication paths. Networks may interconnect with other networks and contain sub-networks. A network may transmit or receive any type of data. In some embodiments the network may consist of any wireless protocols or other communication protocols. As used herein, network may be used in conjunction with or interchangeably with database, system, or any other combination of hardware and/or software to achieve tasks such as, but not limited to, contacting a user or vehicle, communicating with a user or vehicle, communicating with a utility company, communicating with a parking garage, communicating with a Global Positioning Satellite, and the like.

The present disclosure describes embodiments of a system for charging at least partially electric vehicles 100 or any battery contained within an at least partially electric vehicle. In FIG. 1, the system includes an at least partially electric vehicle 102, a charging vehicle 104, and a network 106. The electric vehicle 102 (which, throughout the disclosure, may be an at least partially electric vehicle) may, in some embodiments, request a transfer of electrical energy from the charging vehicle 104 to charge the electric vehicle's battery using the network 106. In some embodiments, the request may be instigated manually by a user.

Electric vehicles or plug-in hybrids generally include various connectors, power connectors and communications connectors. The charging port may be a specific port for fast-charging, and/or may include a communications port for determining characteristics of the vehicle's battery. In some embodiments, the charging port is electrically coupled to a battery for powering at least part of the vehicle. Generally, vehicles also include a main/standard connector, i.e., the interface in which the vehicle receives charge. In some embodiments, the fast-charging connector or coupling replaces the main connector/coupling. In various embodiments, the coupling may be inductive or conductive. The coupling is any one of those known in the art. Additionally, in some embodiments, a feature is included to sense the type of battery intended to be charged.

In an exemplary embodiment, the electric vehicle may include an electrical connection (not shown in FIG. 1) and a communications system (not shown in FIG. 1). The electrical connection allows the electric vehicle 102 to receive energy from the charging vehicle 104. The electrical connection may be installed as a kit to an existing vehicle, or, in some embodiments, the electrical connection may be built into the vehicle. The electrical connection may be electromechanical or semiconductor.

Both the electric vehicle 102 and charging vehicle 104 include couplers, allowing them to be connected in order for the charging vehicle 104 to transfer electric power to other vehicles. In addition, the electric vehicle 102 may include and/or may be configured to include a communications system. This system may enable an occupant, and/or be configured to enable an occupant, of the electric vehicle 102 to request a charge from the charging vehicle 104 using the network 106. In some embodiments, the electric vehicle 102 may have a communications system consisting of a Global Positioning Satellite (herein referred to as GPS) receiver that may be used to determine the vehicles location and provide location information to the network 106. The GPS system may also include a wireless communication system including, but not limited to, a BLUETOOTH® connection, or the like, to further enable communication of information. In addition, the electric vehicle 102 may include a wireless connection that may provide direct communication or may communicate via a communication network with the charging vehicle 104.

The charging vehicle 104 may be any type of vehicle capable of carrying stored energy. In some embodiments, the charging vehicle 104 may be a truck or larger vehicle such that the energy capacity in the charging vehicle 104 is larger than the energy capacity of the electric vehicle 102. The electric potential voltage of the energy source in the charging vehicle 104 may be greater than the electric potential of the batteries in the electric vehicle 102 (or vice-versa). This electric potential difference may be regulated by using a converter (including, but not limited to, a buck converter). In some embodiments, the charging vehicle 104 may include a generator and in some embodiments, the generator may be a Stirling machine/Stirling engine, to provide power to the electric vehicle 102 and/or to charge at least one battery on the electric vehicle 102. In some embodiments, the Stirling machine may be any Stirling machine, which may include, but is not limited to, those embodiments described in or similar to the ones disclosed in U.S. Patent Application Publication No. US-2008-0314356 published Dec. 25, 2008 and entitled Stirling Cycle Machine, U.S. patent application Ser. No. 12/829,320 filed Jul. 1, 2010 and entitled Stirling Cycle Machine, and U.S. patent application Ser. No. 12/829,329 filed Jul. 1, 2010 and entitled Stirling Cycle Machine, all of which are hereby incorporated herein by reference in their entireties. In some embodiments, a generator, which, in some embodiments, may be a Stirling machine, may charge the at least one battery of the charging vehicle, which battery may, in turn, provide power to the at least one electric vehicle battery. In some embodiments, this charging method and system may be similar to that described in U.S. Pat. No. 7,469,760 issued Dec. 30, 2008 and entitled Hybrid Electric Vehicles Using a Stirling Engine, which is hereby incorporated herein by reference in its entirety. In some embodiments, the charging vehicle 104 may include any power source, including but not limited to, any external or internal combustion generator, solar panels or fuel cells. Further, in some embodiments the charging vehicle 104 may be able to charge more than one electric vehicle 102 simultaneously. In some embodiments, the electric vehicle 102 may include a Stirling machine/Stirling engine, to provide power to the electric vehicle 102 and/or to charge at least one battery on the electric vehicle 102.

Similar to the electric vehicle 102, the charging vehicle 104 may have a network connection to send and receive information from a central database along with a GPS receiver to determine its location. In some embodiments, the electric vehicle 102 communicates with the central database, and may also communicate with the charging vehicle 104. Also, or in addition to, the charging vehicle 104 may communicate with the central network and may or may not communicate with the electric vehicle 102.

The communications between the electric vehicle 102 and the charging vehicle 104 are directed through a network 106. The network 106 is configured such that the electric vehicle 102 and the charging vehicle 104 may communicate with one another. This communication allows a user to receive electrical energy at any desired location, time, or price. In some embodiments the network may consist of any wireless protocols or other communication protocols. In some embodiments, typical information that may be transferred to and from the network 106 may include, but is not limited to: the time of day and/or the date for off-peak billing and/or on-peak charging, an amount of charge requested, an identifier for the vehicle, an identifier for the person requesting the charge, account ID, and/or the location of vehicle.

Figure 2:
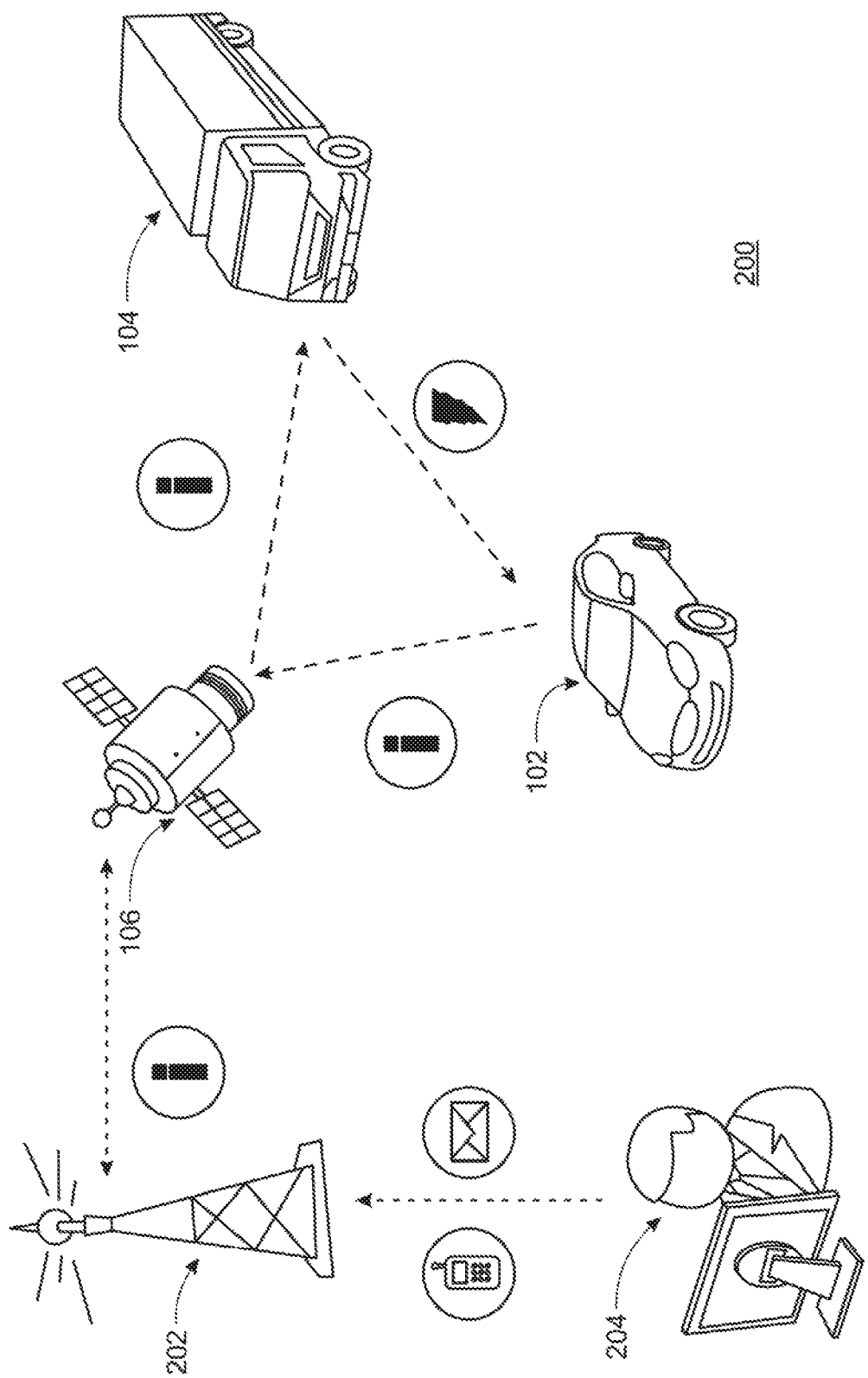
FIG. 2 is an illustration of one embodiment of a system for charging electric vehicles having a central database.

Referring to FIG. 2, one embodiment of a system for charging an electric vehicle 200 including a central database 202 is shown. This database 202 receives the requests for electrical energy from the users 204 which, may, in some embodiments, be an electric vehicle 102 (via a communication system and/or network connection). The users 204 may submit their requests using any form of communication, including, but not limited to, the network, personal computer, telephone, cellular phone, or any wireless communication protocols or other communications protocols. In other embodiments, user requests for energy and personal information may be stored by the database 202 using personal user accounts. These accounts may include a regular energy transfer schedule. The transfer schedule allows the user to select a particular time and place at any predetermined intervals (i.e. every week) to re-charge the electric vehicle 102.

In addition, the user 204 may subscribe to a computer/network automated-buying program. In some embodiments, this program may allow the customer to automatically purchase energy when the cost of electricity is at or below a certain price. This program may be configured such that the user may obtain electrical energy at a reduced price. In some embodiments, the user inputs into the program, for example, but not limited to, the amount of electricity he or she wants to buy and the price he or she is willing to pay. In some embodiments, when the cost of electricity is equal to or below the price given by the user, the database 202 may purchase the desired quantity of electricity. After purchasing the electricity, the database 202 may contact the user, which, in some embodiments may be through one or more of the following, including but not limited to: electronic mail (herein referred to as email), text message, voice message, or any other type of communication. This may alert the user that a purchase has been made. In some embodiments, the database 202 may include an online website to receive payment using a credit card, debit card, or electronic bank transfers. In other embodiments, the database 202 may send weekly or monthly statements to users via postal service, email, text message, voice message, or any other type of communication.

Upon receiving the user's request, the database 202 may contact the network 106 to locate a charging vehicle 104. The database 202 may contacts the network 106 to obtain information, which may include, but is not limited to, the charging vehicles 104 closest to the user's area, in order to determine which charging vehicle 104 may satisfy the requirements of the user. The database may contain information relating to the locations of multiple charging vehicles 104, the number of electric energy charges available on those vehicles, and/or the number of charging vehicles 104 within a particular area. In some embodiments, the GPS may be used as a guide to direct the electric vehicle 102 or the charging vehicle 104 along a route that is energy efficient.

After the database 202 determines which charging vehicle 104 is to service the user, the charging vehicle 104 receives the user's request from the network 106. In some embodiments, the charging vehicle 104 locates the user's electric vehicle 102 using, but not limited to, GPS coordinates from the network 106, radio frequency identification (herein referred to as RFID), or the like. In some embodiments, the charging vehicle 104 locates the user's electric vehicle 102 using a laser scanner, camera, or any other device that may remotely locate a vehicle. For example, if the electric vehicle 102 is located in a parking lot, a scanner, or laser, may be able to read identifying features of the vehicle. Such laser may be suspended in a tower, building, or the like, so as to have the optimal vantage point. This scanner or laser would in turn communicate with the network and/or the charging vehicle 104. After locating the user's electric vehicle 102, the charging vehicle 104 transfers the requested amount of electric energy to the electric vehicle 102. Upon completion of the energy transfer, the charging vehicle 104 may transmit information concerning the energy transfer to the central database 202. The database 202 may notify the user that the transaction has been completed through email, text message, voice message, or any other type of communication. In some embodiments, the electric vehicle 102 may service the charging vehicle 104 by selling charge. Note, throughout the disclosure, energy may be marketed with little or no transmission loss. Typically, there is about seven percent (7%) transmission loss on power lines. Aside from the transmission loss, the areas containing power lines have to be maintained and cared for in order to ensure optimal operability. Further, with power lines, there are thousands of miles of un-used infrastructure. The present disclosure may lower transmission loss and hence creates a more efficient energy transfer infrastructure.

Figure 3:
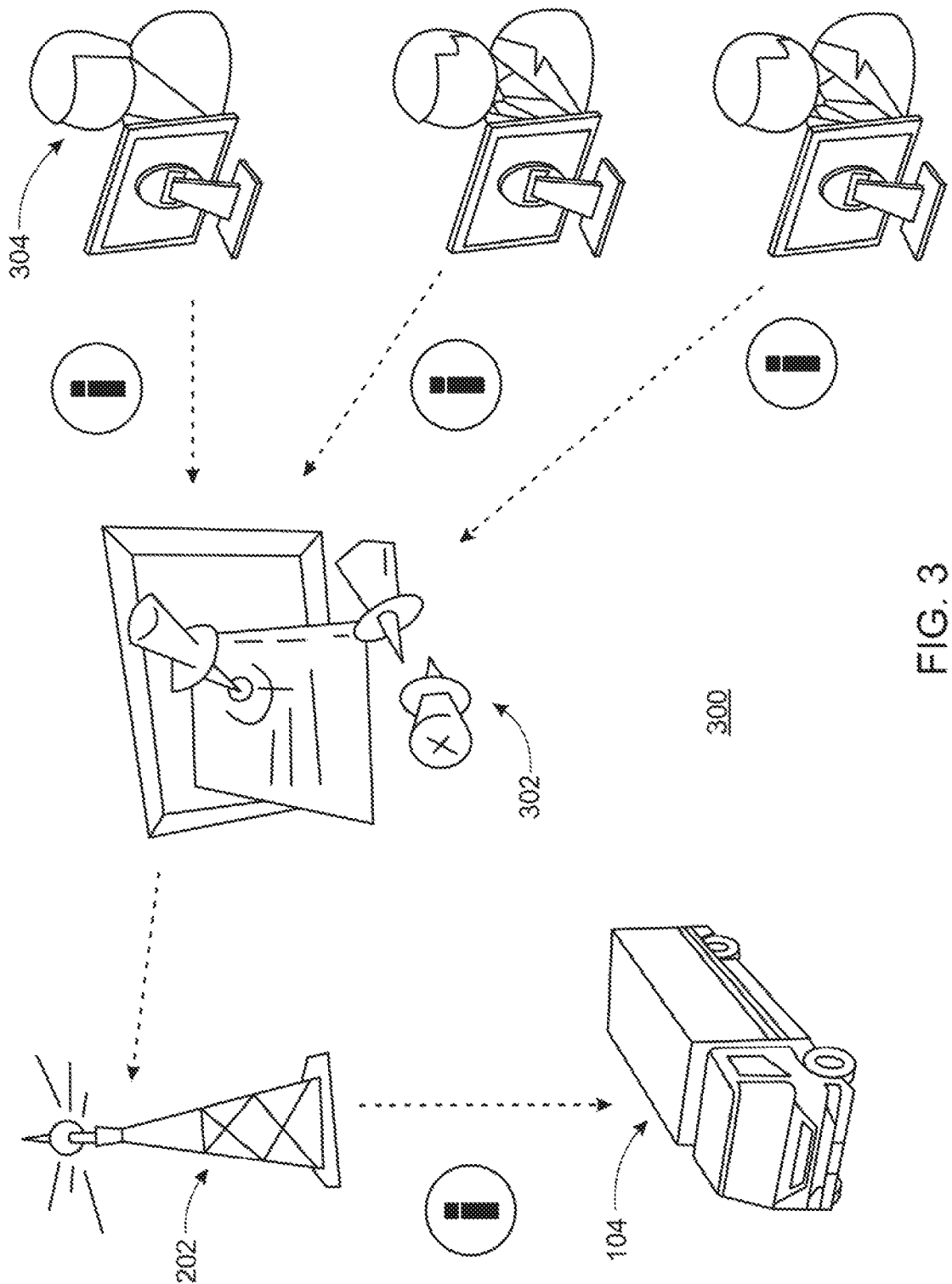
FIG. 3 is an illustration of a system for accessing to electrical energy consistent with some embodiments of the present disclosure.

In some embodiments, the system for charging electric vehicles 300, shown in FIG. 3, further includes an online website 302. The online website 302 may be similar to, but is not limited to, an online bulletin board, an online social networking site, or the like where users 304 may request service from the charging vehicle 104. In other embodiments, the online website 302 may be similar to a brokerage account, or the like, where the user requests to "buy" a re-charge, and the website finds a matching source for the re-charge (and in some embodiments, the website may charge a fee, for example, a percentage of the price of the re-charge, or a flat fee for the brokerage). In some embodiments, users 304 may access the online bulletin board using the internet, in-vehicle web browser, personal computer, cellular phone, BLACKBERRY brand or similar device, or personal digital assistant (herein referred to as PDA). This online bulletin board 302 allows users 304 to talk to one another and share resources. Users 304 may share resources by pooling their money together to obtain a lower price from the utility company because the users 304 as a group are purchasing more electricity than they would be individually. The larger the amount of electrical energy purchased, the more likely that the users 304 may negotiate a lower price from the energy provider.

These users 304 may use chat rooms, blogs, or the like, within the online bulletin board 302 to find other people who will need electrical energy at similar times and locations. These users 304 may reserve a charging vehicle 104 that would service everyone in the group at a particular time and location. This type of group reservation would be advantageous for people who work in a large corporation, because the employees would be a large group of people located in one place. Thus, the employees could reserve a charging vehicle 104 at a lower rate because the employees would be buying the energy in a large quantity. In addition, the employees all have a common place and time where they would like to have their electric vehicles re-charged, that is while the employees are at work. In operation, the employees reserve a charging vehicle 104 to service all their vehicles while they are at work using the online bulletin board 302. The reservation is transferred to the database 202 through an internet or satellite connection. When the database 202 receives the reservation, the database 202 will dispatch a charging vehicle at the users' 304 requested time and place. The charging vehicle 104 will transfer electrical energy to the electric vehicles 102 of all the employees listed on the reservation.

Figure 4:
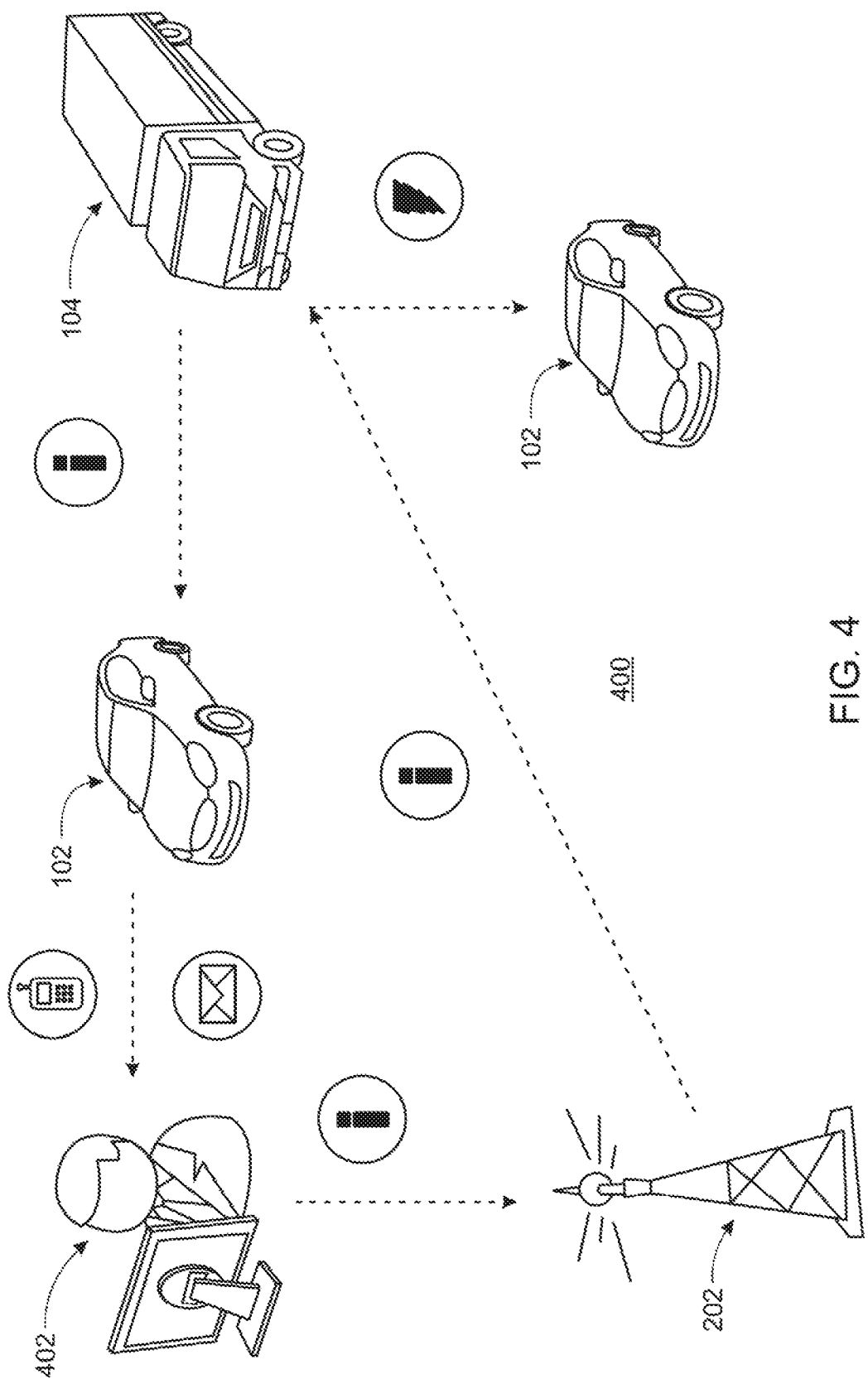
FIG. 4 is an illustration of a system for charging electric vehicles wherein the energy supplier contacts a user.

In some embodiments, in the system for charging electric vehicles 400, shown in FIG. 4, the charging vehicle 104 may contact the electric vehicle 102 initially using a wireless network. This communication allows the charging vehicle 104 to determine whether the electric vehicle 102 requires electrical energy. This system is advantageous because it allows the charging vehicle 104 to deliver more electricity more efficiently. Using the system, the charging vehicle 104 may locate more electric vehicles 102 in a location where the charging vehicle is already present. Thus, the charging vehicle 104 will use less energy to transport its stored energy because the charging vehicle 104 will be distributing energy as it travels, as opposed to distributing energy from one user vehicle location to another user vehicle location. The electric vehicle 102 may contact the user 402 to request permission to purchase electricity using an email, text message, voice message, or any other type of communication. Once the user 402 decides he or she wants to purchase electricity, the user 402 may send a request for electricity to the database 202. The database 202 contacts the charging vehicle 104 to transfer the request amount of energy to the electric vehicle 102.

In other embodiments, the user 402 may instruct the electric vehicle 104 to contact the charging vehicle 104 directly to make the request for energy. This direct contact may be beneficial because this process may reduce the time required to complete the transaction. The reduction in time is the result of, but not limited to, not requiring the user to authorize payment. Thus, the transaction time may be reduced and the charging vehicle 104 may move to another user more quickly, allowing the charging vehicle 104 to accomplish more transactions within a shorter period of time.

In some embodiments, the charging vehicle 104 may deliver various products when charging an electric vehicle 102. Such products may include, but are not limited to, groceries, packages, dry-cleaning, take-out food, or any other type of product a user may order, either online, or from a store, restaurant, or the like. In some embodiments, the charging vehicle 104 may also provide an off-peak delivery system, delivering any type of product, such as, but not limited to, the products listed above. In some embodiments the charging vehicle 104 may also deliver goods when most electric vehicles are not on the roads, for example, late at night, or early in the morning.

In some embodiment, the charging vehicle 104 may not be a "vehicle" per se, but rather may instead be stationary or parked, or may be a portable trailer or other apparatus or device capable of providing energy (herein referred to as charging device) which may be stationary or portable. Thus, in various embodiments, the charging device may contain a number of battery cells, a generator, or other supply of electrical energy. In addition, the charging device, in various embodiments, may be connected to a utility grid. This connection allows the charging device to be charged at any time including during off-peak hours when the demand and price of electricity is lower. In some embodiments, the charging devices may be re-charged using a generator.

Similar to the charging vehicle 104, the charging device may have a network connection 106 allowing users to determine where the nearest pod is and how much electrical energy the charging device has remaining. It is to be understood by one of ordinary skill that a charging device may be used instead of, or in place of, a charging vehicle 104 throughout the disclosure, without parting from the scope of the disclosure.

Figure 5:
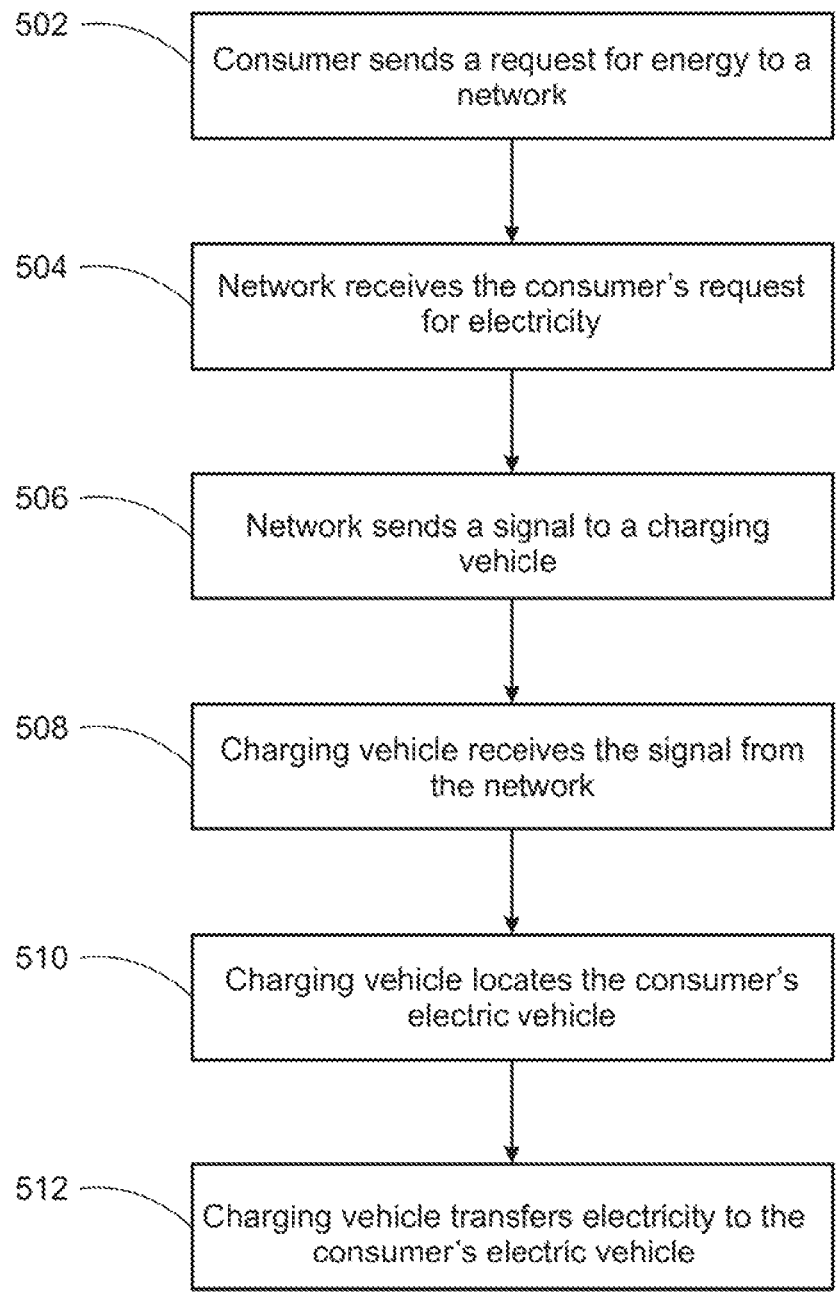
FIG. 5 is a flow diagram illustrating a method for charging electric vehicles consistent with some embodiments of the present disclosure.

This disclosure also describes a method for charging an electric vehicle 500 using the system described herein. FIG. 5 includes, but is not limited to, the following steps: sending a request for energy to a network 502, receiving the request for energy from the user 504, sending a signal to a charging vehicle 506 (or in some embodiments, to a charging device), receiving the signal from the network 508, locating the electric vehicle 510, and transferring energy from the charging vehicle (or device) to the electric vehicle 512.

In operation, the electric vehicle may transmit information to the network indicating that the electric vehicle battery cells require charging 502. In some embodiment, the occupant pushes a button within the electric vehicle to activate the request for energy using methods described above. The vehicle communications system then transmits any information required to request a charge. The network receives the information from the electric vehicle and relays that information to the charging vehicle.

In some embodiments, the user need not be present in the vehicle to contact the charging vehicle. The user may use any communications system to communicate with the network to request a charge. The user provides any relevant information necessary to request the charge. In some embodiments, the charging vehicle may initially contact the electric vehicle to determine if the electric vehicle needs an electrical charge. Upon receiving the signal from the charging vehicle, the electric vehicle may contact the user through email, text message, voice message, or any other type of communication to notify the user that a charging vehicle is nearby. Then, the user may decide whether to purchase electricity from the charging vehicle.

In addition, the user may receive confirmation through any one or more of the following, including but not limited to: email, text message, voice message, or any other type of communication that the request for electrical charge has been accepted. In some embodiments, the user may receive confirmation of a request for electrical charge via any one or more of, but not limited to, the following: email, text or voice message sent to a cellular phone, BLACKBERRY brand or other similar device, and/or PDA.

In addition to the various information provided to the network to request a charge, the user may provide a "special comments section." In such a case, the user may provide the charge level and location of his or her vehicle. Other information that may aid the charging vehicle in locating the electric vehicle may additionally include the make, model, color of the vehicle, or the like. In some embodiments, there may be encoded metadata, rather than simple text. For example, categories of information may be encoded with information such as make, model, location, and the like. Such information may be filled in automatically based on a user's profile and/or preferences. In some embodiment, the charging vehicle may be equipped with a machine vision component which may be able to detect the make, model, color, or the like of an electric vehicle through the use of conventional techniques such as, but not limited to, image processing, character recognition, pattern recognition, or the like. Therefore, the charging vehicle may know the electric vehicle's level of charge, location, make, and model.

The network may receive 504 and transmit 506 a signal to the charging vehicle using a communications protocol. The signal may contain instructions for an operator of the charging vehicle as to when and where to deliver the energy to the user's vehicle. This may be advantageous because the user may receive electrical energy when he or she is not using the vehicle. Users may instruct the charging vehicle to deliver electrical energy while they are at work or shopping in a store. In addition, the transmission from the satellite may include, but is not limited to, the following information: the electric vehicle owner's name, the amount of charge requested, the license plate number, description of the vehicle, and location of the electric vehicle at the time of delivery. In some embodiments, the signal from the network to the charging vehicle may be accomplished using a wireless internet connection or cellular communications network.

The charging vehicle may receive the signal from the network 508 using a wireless internet connection or other communications protocol. Once provided with the user's information, the charging vehicle may locate the electric vehicle to deliver the requested amount of charge 510. Using the information provided from the network, the electric vehicle may be located using a map. In the exemplary embodiments, the charging vehicle may locate the electric vehicle using coordinates from a GPS. With the electric vehicle located, electrical energy may be transferred from the charging vehicle to the electric vehicle 512 using a coupler, as described in more detail above.

This disclosure also presents a method for charging an electric vehicle further including the step of providing a notification to the user confirming that the energy has been delivered to the electric vehicle. This post-delivery notification allows the user to maintain a record of the energy transfer. Typical information that may be included in the notification may be time of transfer, amount of energy transferred, price rate of the transfer, and the total cost for the transferred energy. In the exemplary embodiment, the charging vehicle contacts the network upon completion of the transfer of energy to the user's electric vehicle. The network may then contact the user to indicate that the user's vehicle has been charged by any one or more of the following, including, but not limited to: email, text or voice message sent to a cellular phone, BLACKBERRY brand or other similar device, PDA, or any other type of communication to the user's personal computer, cellular phone, BLACKBERRY brand or other similar device, and/or PDA.

In some embodiments, the electric vehicle may notify the user that the electric vehicle is fully charged. In these embodiments, the electric vehicle may use the vehicle's communication system by any one or more of the following, including, but not limited to: email, text or voice message sent to a cellular phone, BLACKBERRY brand or similar device, PDA, or any other type of communication to the user's personal computer, cellular phone, BLACKBERRY brand or similar device, and/or PDA.

Figure 6:
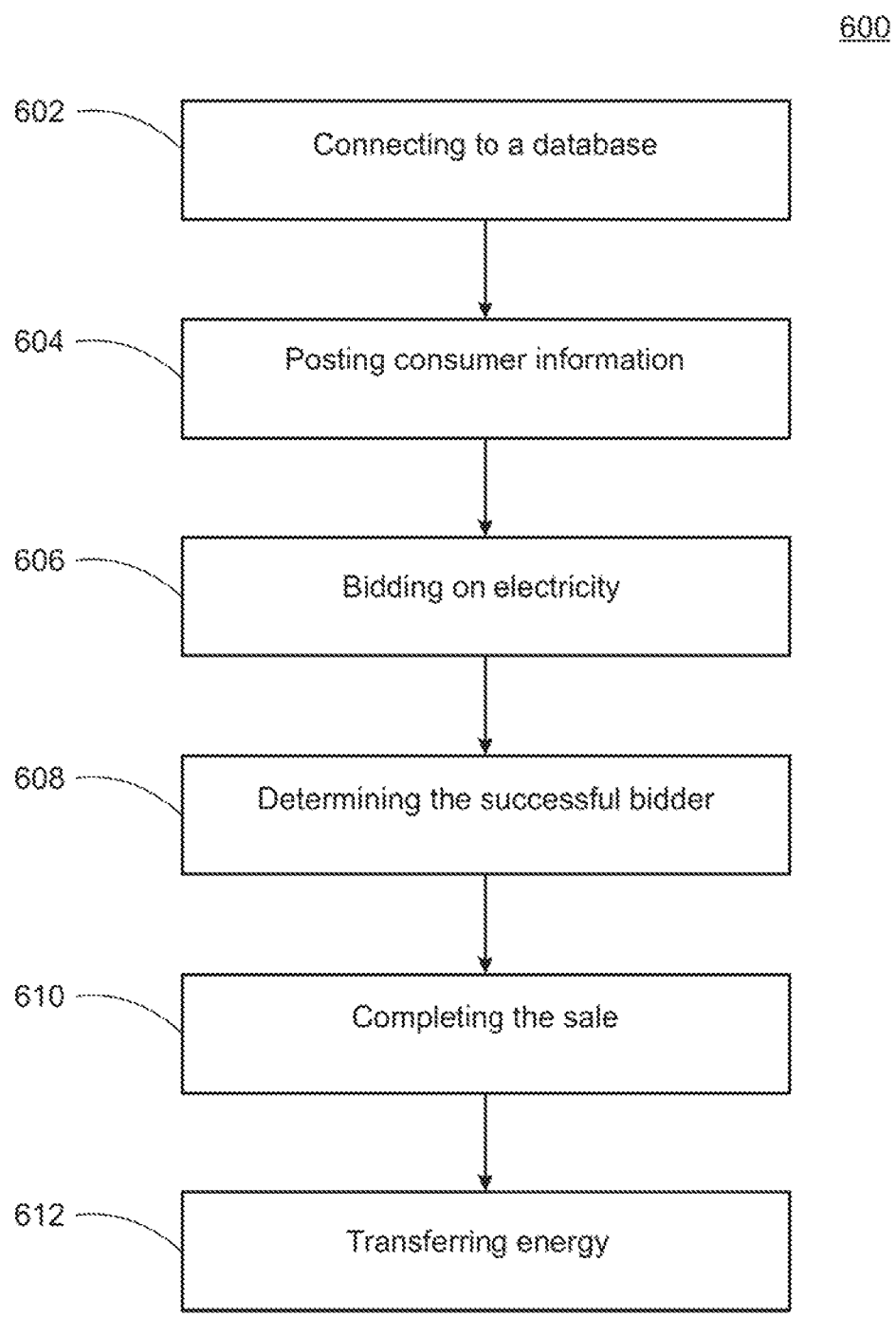
FIG. 6 is a flow diagram illustrating a method for users to purchase and sell electrical energy.

This disclosure also describes a method for selling and buying electricity 600, shown in FIG. 6, which includes, but is not limited to, the following steps: user connecting to a database 602, posting a user information 604, bidding on electricity 606, determining the successful bidder 608, completing the sale of electricity between the user and the successful bidder 610, and transferring the electrical energy to the successful bidder 612. Additionally, the method may apply to multiple users and multiple providers. There may be a successful provider bidder and a successful user bidder.

In some embodiments, users log onto a website, such as an online bulletin board, using an internet connection 602. Users may use, for example, but not limited to, a personal computer, cellular phone, BLACKBERRY brand or similar device, and/or PDA to access the bulletin board. Once connected, users may provide information to the online bulletin board that includes, but is not limited to, user's name, address, whether the user is a buyer or seller, and payment information (credit card, debit card, or electronic banking information). In addition to users, utility companies may offer to sell or buy electricity directly to and from the users. Thus, the database may act as a broker between the users and utility companies. In some embodiments, the utility companies may offer incentives to the user, for example, credit if user reserves a certain time for re-charge. Similarly, if utility companies stop or interrupt user's charge cycle, the companies may give user a credit, a certain bonus, or a special promotion. Furthermore, if the charge service gets interrupted, either by the utility companies or the charging vehicle, user may be paid a premium for the interruption.

In operation, a first user decides to sell the electrical energy stored in his or her electric vehicle. The first user may desire to sell the stored electricity, because he or she may now get a higher price for the electricity than what he or she originally paid. The user may post a message 604 on the website stating he or she is willing to sell a certain amount of electricity for a specific price. The posting of the user's request may be accomplished by sending an email to or accessing the online bulletin board.

Next, either a utility company or a second user may bid on the first user's electricity 606. If there are multiple bids then the successful bidder will be sold the first user's electricity. Bidding may be accomplished by a user accessing the online bulletin board and indicating that he or she would like to purchase the first user's electricity at a specific price. In other embodiments, the bidders may specify a particular quantity of electricity they want to purchase in addition to a particular price. Thus, in this embodiment, the first user may sell his or her electricity to several different bidders in various quantities.

In an exemplary embodiment, there may be a time limit for accepting bids. After the time limit expires, the online bulletin board compares all the bids to determine the successful bidder 608. The successful bidder is then given the opportunity to purchase the electricity. The transaction is completed 610 when the successful bidder provides payment to the first user's account using the online bulletin board and the first user transfers the electricity to the power grid. Then, the online website contacts the power grid to notify the grid that the successful bidder has purchased a quantity of energy from the first user at a specific price. The power grid transfers the energy to the successful bidder at the bid price.

Figure 7:
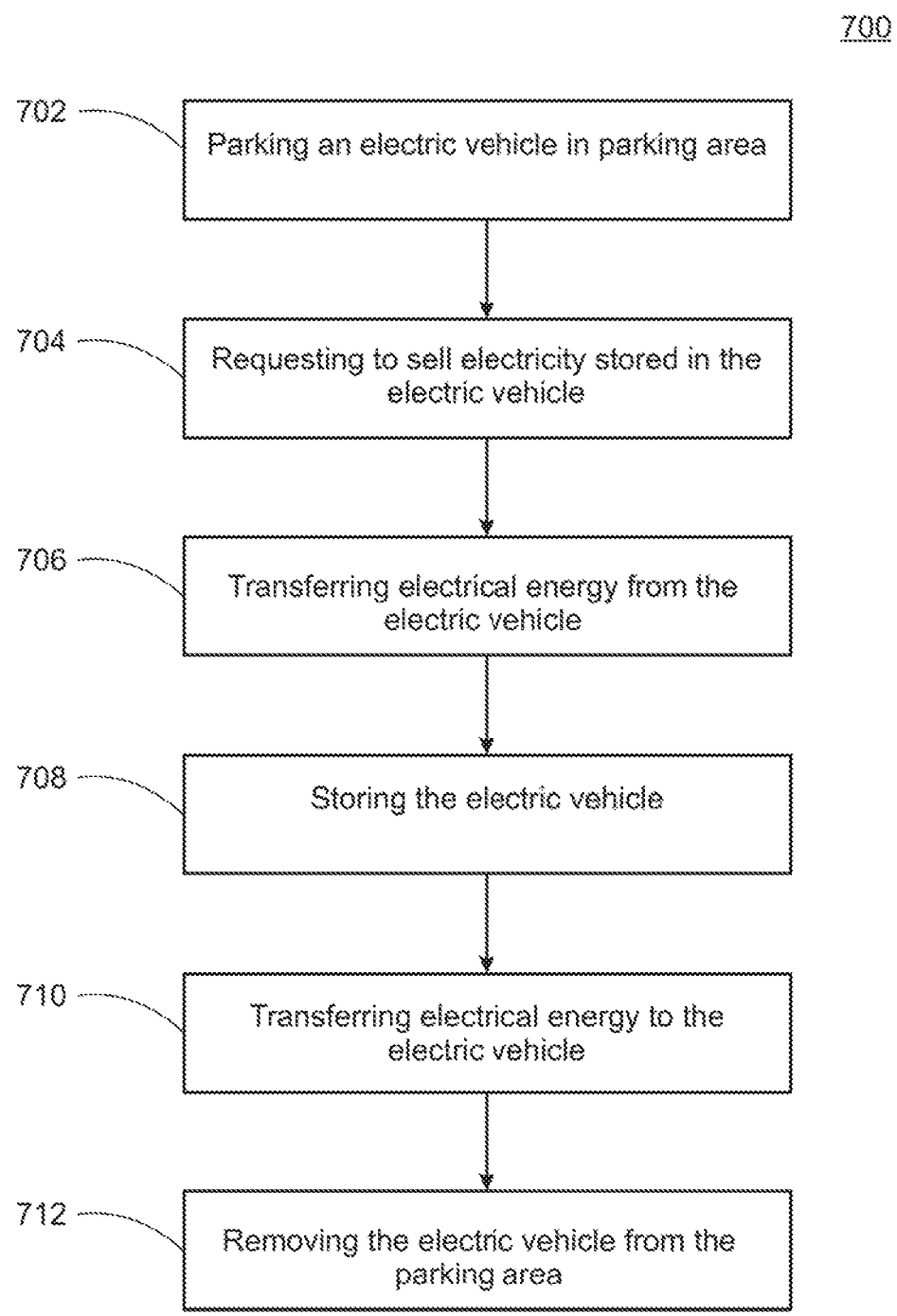
FIG. 7 is a flow diagram illustrating a method for selling users' stored electrical energy for some embodiments.

The present disclosure also presents a method for selling and buying electricity 700, shown in FIG. 7, that includes, but is not limited to, the following steps: parking an electric vehicle in a parking area 702, requesting to sell electricity stored within a user's electric vehicle 704, transferring electricity from the electric vehicle 706, storing the electric vehicle 708, transferring electricity to the electric vehicle 710, and removing the electric vehicle from parking area 712.

In some embodiments, the user drives his or her electric vehicle in a parking garage. The electric vehicle's GPS receiver, or any other wireless communication device used to triangulate vehicle position, may direct the vehicle to an open parking spot. This may save the battery charge of the vehicle since the electric vehicle will not circulate the garage looking for an available parking spot. The user may choose to sell all or a portion of the stored electricity in his or her electric vehicle to the parking garage. While the vehicle is parked, the user may buy energy or sell energy already in the vehicle. In operation, the user parks his or her electric vehicle in a designated parking area 702. In some embodiments, the parking area may be a parking garage or a parking lot. The user then notifies the parking attendant that the user would like to sell the electricity currently stored in his or her electric vehicle to the parking garage 704. In some embodiments, the parking garage will reduce, either fully or partially, the user's parking fee by the amount of energy that is transferred from the user's vehicle. In other embodiments, the user may receive cash or a credit towards purchasing energy when the user picks up his or her vehicle. In addition, the user also notifies the parking garage as to when the user would like to pick up his or her vehicle.

After the user authorizes the sale of electrical energy, the parking garage removes the energy from the user's electric vehicle 706. In an exemplary embodiment, the electricity from the first user's electric vehicle is transferred to a second user's vehicle. In some embodiments, the energy may be transferred by the parking garage to the utility grid or to an electrical storage device within the parking garage. After the transfer of energy, the user's electric vehicle is stored 708 within the garage until the date that the user agreed to pick up his or her electric vehicle. In some embodiments, the parking garage may sell the charge capacity of the battery or the use of the battery to an electric vehicle, as opposed to selling the charge itself. Note, any battery throughout the disclosure may be used to store energy from the utility grid and sell the stored energy at peak.

Prior to the user picking up his electric vehicle, the parking garage will charge the electric vehicle by directly transferring energy from an arriving vehicle to the user's vehicle 710. In some embodiments, the user's electric vehicle may be charged by transferring energy from the utility grid or a power source within the parking garage. Once the vehicle has been charged, the user may remove his or her electric vehicle from the parking garage 712.

Other methods may use a smart parking spot rather than a parking garage. These parking spots are designated parking areas where an electric vehicle may receive a transfer of electrical energy. The smart parking spots may be, but are not limited to, areas such as, along streets, municipal parking lots, driveways or any other parking locations. A typical smart parking spot may include a parking structure similar to a parking meter. These structures may provide an access point for the electric vehicle to connect to the utility grid or other power source.

In addition, these parking structures may contain internal communication systems, such as, but not limited to, wired connections, wired internet, wireless internet, or satellite connections. Through the use of the communication system, the parking structure may allow users to reserve a smart parking spot for a particular time and date. The user may create a reservation using, for example, but not limited to, one or more of the following: the internet, mobile communication device, or any other type of communication device. The reservation feature will prevent other users from parking in that reserved spot by not allowing charging access to any other than the user who made the reservation. In addition, the parking structure may contain an indication signal to notify other users that the smart parking spot has been reserved. The indication signal may be any type of indicator, including, but not limited to, being any color indicator (or blinking light) including, but not limited to, an LED or other indication device indicating "green," "red," "reserved," or the like.

The communication system within the parking structure may also communicate with user's electric vehicle to assist the user in locating an available parking spot. Using the electric vehicle's onboard communication system, the user may obtain real time information as to the current and future availability of parking spots within a desired range or at a specified location. In some embodiments, the user may indicate to the system the user's destination ahead of time and the system may either reserve parking spots ahead of time, or scan to see available parking spots. Such implementation may be used regardless of the user's destination. Destinations may include, but are not limited to, shopping malls, grocery stores, theatres, train station, cinemas, sports arenas, doctor's office, hospital, school, work, or the like. The user may also customize parking preferences, such as inputting various preferences into the system ranging from finding the parking spot, destination, or charging station in the most energy efficient manner, finding a parking spot more quickly, or avoiding hills, avoiding stop signs, avoiding stop lights, avoiding traffic, avoiding roads with construction, avoiding highways, avoiding local roads, or the like. The user may also enter more specific preferences, such as, in the case of finding a parking spot, a spot that involves a "short" or a "long" walk to the destination. The user, for example, may not mind walking a "short" distance from the parking spot to his or her destination. In such a case, the user may input a specific amount of time and/or distance he or she is willing to walk. More specifically, the user may specify that he or she is willing to walk a maximum of ten minutes or a maximum of one-half mile. It is to be understood by those of ordinary skill that any type of customization is considered within the scope of the present disclosure. In some embodiments, the GPS may display optimal places to park or re-charge based on price, time, energy efficiency, or the like.

In some embodiments there may be a dynamic billing and purchasing system in which users may determine what type of energy they are buying and at what cost. Such a system may provide instantaneous connections between the distribution and load/site, and may also take into account certain factors such as, but not limited to, the proximity of buyers and sellers. Proximity may be in regards to the distance, time, or energy that may be needed for buyers and sellers to transfer energy. Such a factor may be taken into account by some users when evaluating the desirability of a particular transaction. Enabling such a dynamic system may make the system more practical, flexible, and user-friendly.

In some embodiments the dynamic billing and purchasing system may have multiple billing rates, during multiple times of day, and covering multiple energy sources. Similarly there may be multiple billing rates for the multiple energy sources, and there may also be carbon-base pricing, which may be pricing based on the percentage of carbon present in the emissions. Billing rates may vary based on demographic data, charge history, and "brand" of electricity. In some embodiments, demographic data may be seen or accessed by the government for government planning and environmental concerns. Brand of electricity may aid a user in choosing electricity from a company which better represents the user's own personal philosophy. Some brands may market themselves as being more energy efficient, or customer friendly, or more economical, or have an emphasis on quality, or the like. In some embodiments, the dynamic billing and purchasing system may also take into account charge conversion, which may be a charge implemented for converting energy from one source to another source. In some embodiments, the dynamic billing and purchasing system may also take into account a government tax (replacing the conventional government gas tax). Such a tax may be used for a variety of things, including, but not limited to, paying for new roads, paying for road maintenance, or the like.

Figure 7A:
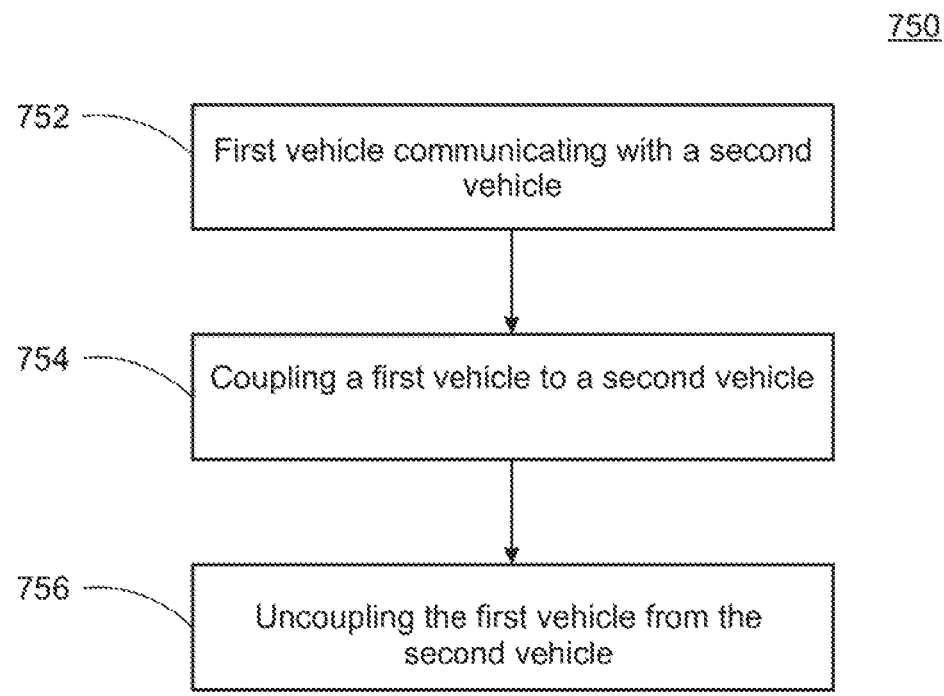
FIG. 7A is a flow diagram illustrating some embodiments of a method for sharing electricity.

Referring to FIG. 7A, the present disclosure also presents a method for sharing electricity 750 that may include, but is not limited to, one or more of the following: a first vehicle communicating with a second vehicle 752; coupling a first vehicle to a second vehicle 754; and uncoupling the first vehicle from the second vehicle 756. In some embodiments, both vehicles are electric vehicles. In other embodiments, both vehicles are non-electric vehicles. And in other embodiments, one vehicle is an electric vehicle while the other vehicle is a non-electric vehicle. In some embodiments, the energy requirement for travel may be shared by the two vehicles, i.e., each vehicle provides propulsion power. In other embodiments, one vehicle absorbs propulsion power while the second vehicle provides propulsion power. In other embodiments, a second vehicle extracts power from the first vehicle while being towed.

In some embodiments, a first electric vehicle may contact a second electric vehicle to determine if the second vehicle would consider temporarily connecting to the first electric vehicle. The communication between the first electric vehicle and the second vehicle may be accomplished using a wireless internet connection or any communication protocol including the network, as described above. Thus the vehicles may connect directly or via the communications network. The coupling of the first vehicle to the second vehicle has several benefits, such as, reduced fuel costs from decreased wind resistance and improved performance as a result of the second vehicle assisting the first vehicle with steering, braking, and acceleration.

Typically, the second electric vehicle will attach to the rear end of the first vehicle as this vehicle arrangement may reduce wind resistance. This arrangement, however, is not the only possible way of connecting the electric vehicles together. Other embodiments may have the vehicles arranged side by side. The first electric vehicle may physically attach in tandem to the second electric vehicle using latches. In some embodiments, the two vehicles are electrically connected, i.e. by plugging the second electric vehicle into the first electric vehicle. In addition, in some embodiments, a mechanical attachment, for example, but not limited to, a trailer hitch connects the two vehicles. In an exemplary embodiment, the first electric vehicle may include a controller to monitor and limit the amount of electrical energy that is transferred to the second electric vehicle. In some embodiments, the vehicles may be coupled while moving or while stationary. Additionally, the vehicles may be uncoupled while moving or stationary.

The coupling method may be controlled by the network, as described above. Thus, the network tracks the energy bought and sold, etc. Also, the network could locate vehicles willing to connect. The network may also locate vehicles which are going on long-trips, for example. This may allow vehicles to share resources by planning trips in advance or in real-time.

Figure 8:
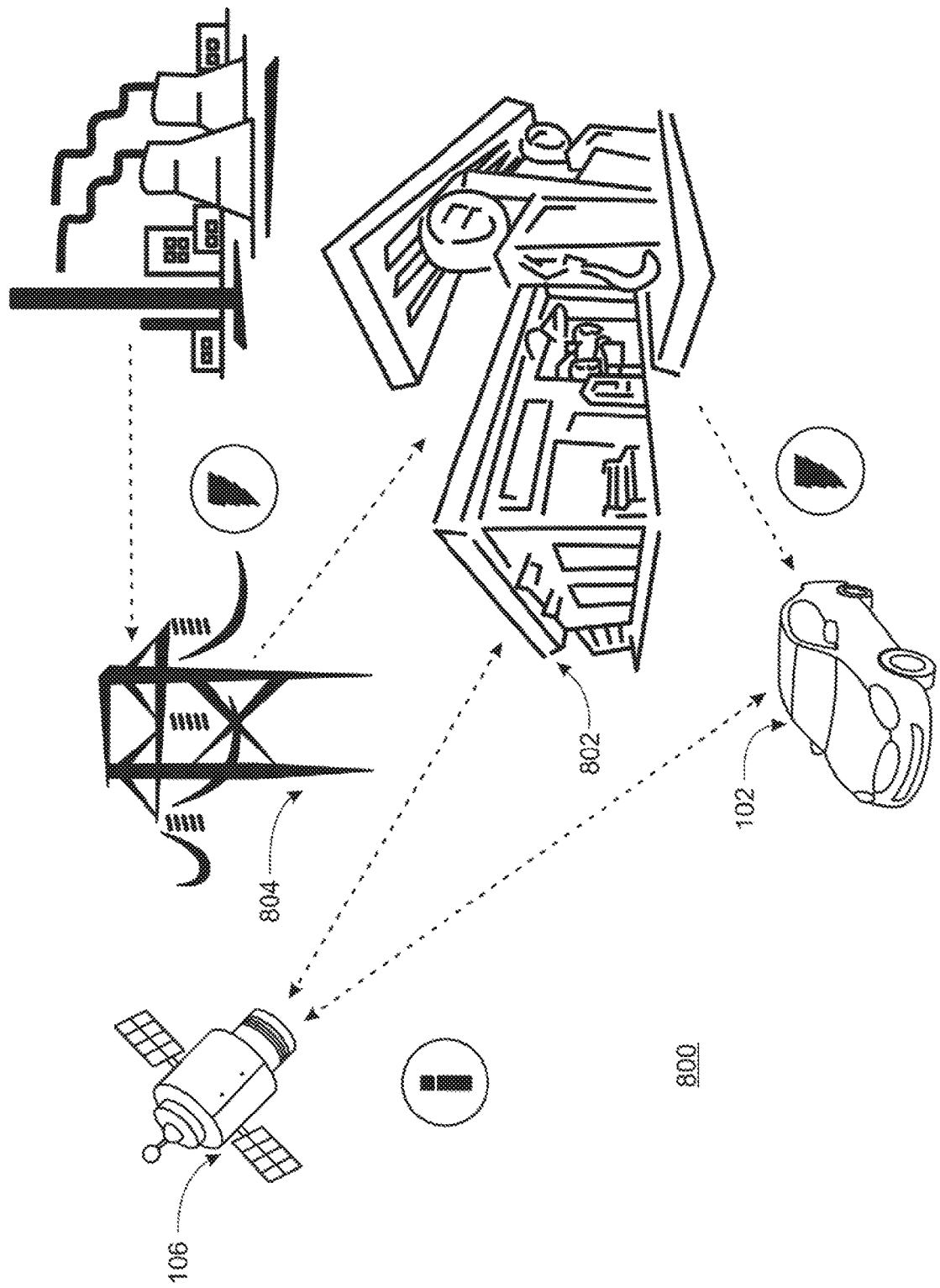
FIG. 8 is an illustration of a system for charging electric vehicles wherein electrical energy is accessible at a charging station.

Referring now to FIG. 8, the present disclosure also describes a system for charging electric vehicles 800. The system includes an electric vehicle 102, a charging station 802, and a network 106. The electric vehicle 102 may request a transfer of electrical energy from the charging station 802 using a network 106.

The charging stations 802 are similar to present-day gas stations. Typically, a charging station may have several electrical inputs to receive electrical connections from multiple electric vehicles 102. These stations may receive electrical energy from a utility grid 804 or from a charging vehicle 104, as described throughout the disclosure. In addition, these charging stations may have network connections that allows an electric vehicle 102 to locate the nearest charging station. This connection to the network 106 may be accomplished using a wired or wireless internet connection.

Figure 9:
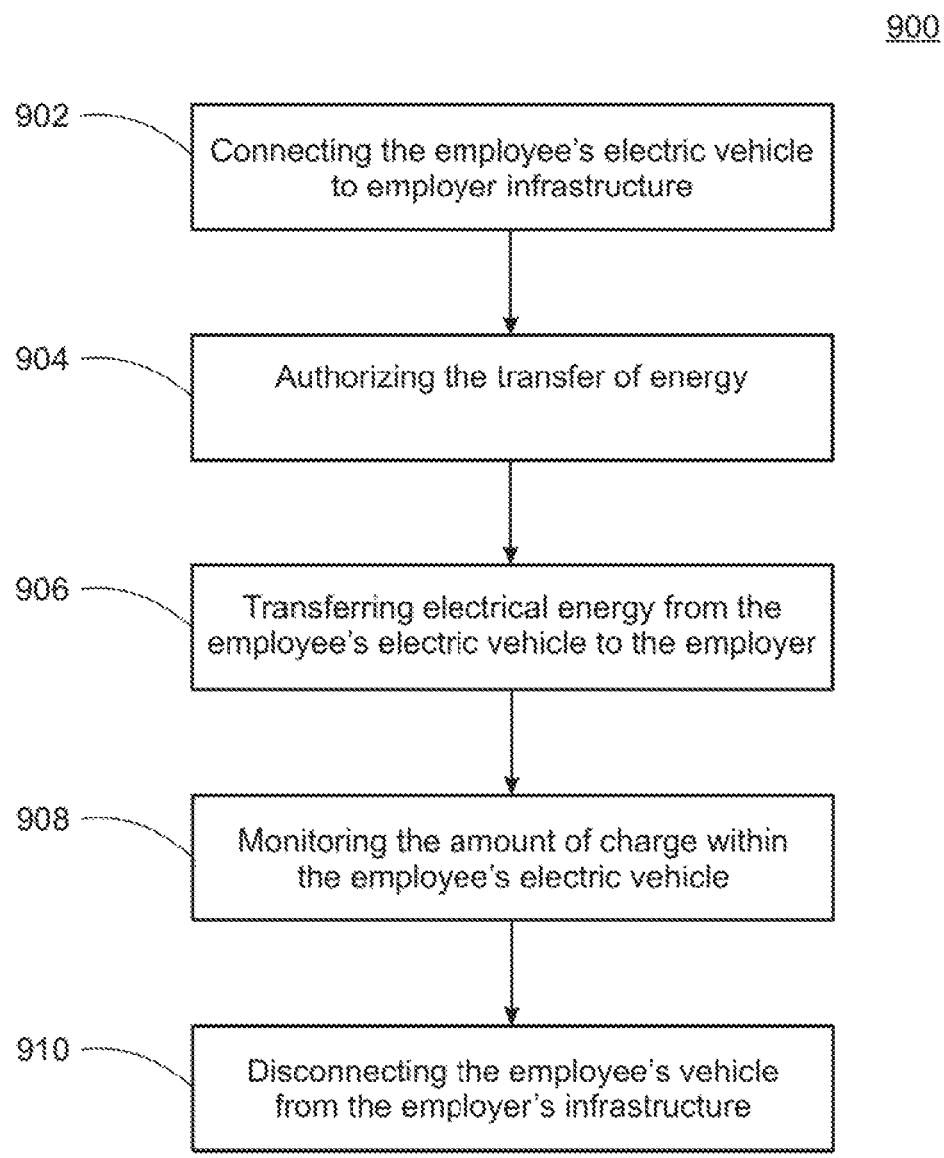
FIG. 9 is a flow diagram illustrating a method of selling electrical energy, for example, from employees to employers.

Referring now to FIG. 9, this disclosure also describes a method for transferring electric energy 900 from an individual's electric vehicle to a building or structure. In some embodiment, as described below, the individual is described as an "employee" and the building or structure is described as an "employer," however, these terms are not meant to be limiting, but used just for exemplary purposes in some embodiments. In some embodiments, the building or structure may be any building including, but not limited to, private homes, residences or apartments, malls, hospitals, airports, office buildings, or other municipal buildings. The same or similar method, as described below, may apply when transferring energy between any of the aforementioned buildings. The method may include, but is not limited to, the following: connecting the employee's electric vehicle to an employer infrastructure 902, authorizing the transfer of energy 904, transferring electrical energy from the employee's electric vehicle to the employer 906, monitoring the amount of charge within the employee's electric vehicle 908, and disconnecting the employees' vehicle from the employer's infrastructure 910. The method described allows an employer to obtain energy from a source other than the utility grid. This alternate source of energy reduces the demand on the utility grid during peak hours because the energy required to operate the employer's infrastructure would come from the employee's electric vehicles. These electric vehicles obtain electrical energy during non-peak hours of electrical use, thus reducing the demand on the utility grid during peak hours of use.

In operation, the employee arrives at work and parks his or her vehicle in a designated location. This location has an interface to transfer energy from the employee's electric vehicle to the employer's infrastructure. The interface includes, but is not limited to, an electrical coupler or a mechanical means for extracting power from the vehicle. After the employee's electric vehicle is connected to the employer's infrastructure 902, the employee authorizes the transfer 904. The authorization for the transfer of electrical energy from the vehicle to the employer's infrastructure may be accomplished by any method including, but not limited to, permission given through the network, entering a key card or passkey, or otherwise entering an ID number on a key pad or touch-screen. The employee notifies the network of the amount of energy he or she is willing to allow to be removed and also, the employee may program a re-charge at a particular time. Thus, the employee may sell his or her energy at peak hours and buy during off-peak hours.

With the transfer of energy authorized, the employee proceeds to start his or her shift. While the employee is working, electrical energy from his or her electric vehicle is transferred to the employer to provide electrical energy to the employer's infrastructure 906. This energy may be used to operate machinery, building equipment, computers, lights, and other equipment used in the ordinary operation of the employer's business.

Once the electrical energy begins to transfer from the employee's electric vehicle to the employer's infrastructure 906, the transfer is monitored so as to prevent total transfer of the energy from the employee's electric vehicle. Through the process, the network will be able to determine the amount of charge available in the vehicle's battery, and also, monitor the removal of energy from the battery. Upon completion of the employee's shift, the employee disconnects the electric vehicle from the employer's infrastructure 910. The employer thus may pay less to the utility company for peak power.

As another example, an aircraft may be used to transfer energy to an airport, or the like. For example, instead of powering off an aircraft when it is not in use, it may be beneficial to let the aircraft idle and use the energy produced to generate power for the airport. Note, generators may be used, throughout this disclosure, as a means to supplement or to provide more power to a facility, vehicle, or the like.

As another example, power may be needed in one place for a relatively short period of time. For example, a concert hall may require power for a two-hour performance. In such a case, users' electric vehicles may be used to provide power to the concert hall for the desired period of time. While users attend a concert, their vehicles remain parked, usually in a parking lot or garage. The parked vehicles may supply a collective power to the concert hall, thereby leveling the load on the utility power grid. Such transfer of power may be achieved with little to no transmission loss, which in turn, may help conserve energy.

In some embodiments, the user may have a choice as to the type of charge and the type of battery he or she would like to purchase. The choices of battery charge, for example, may be similar to the choices a user has at a conventional gas pump, typically: regular, plus, and/or premium. This may be determined based on the battery's chemical properties. For example, a regular battery may be of lead acid, a plus battery may be of nickel chemistry, and a premium battery may be a lithium battery or better. The user may determine which type of charge best suits his or her needs. If the user does not drive the electric vehicle very often, he or she may find it economically beneficial to select a regular charge, or a charge of lesser quality. Similarly, the user may also have a choice as to the type of battery he or she would like. Most batteries have a life expectancy, and usually the more they age and the more they are charged, the less charge they can hold. Thus, rating the batteries to the effect of: e.g. regular, plus, and/or premium (the designations or names used herein are for example only and may vary in other embodiments) may be beneficial to a user in choosing the battery that best fits his or her needs. For example, if the user has a short commute, he or she may find it economically beneficial to purchase a regular battery, which may be less expensive than plus or premium battery. Further, as a battery degrades, the rating of the battery may change. Thus, the cost of the battery, the type of battery charges over time, and the use of the battery, just to name a few, may play a role in the overall rating of a battery. The user may also choose batteries according to the battery's number of watt hours, composition, chemistry, standard power density, capacity, wear, life-expectancy, percentage of charge, overall quality, and the like. The user may also choose not to own a battery, but rather to lease it. Therefore, the charging vehicle or device may simply swap out batteries every time the user is due for a "charge," as opposed to charging the battery in the electric vehicle. The user may also request a certain amount of energy from a charging vehicle or device, which is then supplied to a battery of user's choice. Further, the GPS located within the user's electric vehicle may scan the system to find a certain charging vehicle, charging device, or charging station with certain types of batteries, i.e. batteries with 50% charge, 10% charge, and the like. This may be beneficial to the user especially if he or she needs a charge during peak hours. This function may be economically beneficial to the user who may perhaps need a lesser-charged-battery for a short trip.

In some embodiments, the system for charging electric vehicles may calculate the cost and/or depreciation of user's battery. For example, the system may calculate the depreciation cost of one cycle of the battery in order for the user to see how much it is costing. In another example, over the life of user's battery, the system may calculate the number of charges a user may need to sell in order to cover the cost of the battery. User's account may include an optimal user profile, for example, which may manage user's battery for optimal life and optimal profit. Such profile may be built into the infrastructure and may provide user with ideas and cues for optimal use to be met, as well as provide the user with a report on the health of the battery. Such calculations may be built into the sale price of the battery.

Some embodiments may provide incentives or disincentives for users to hold on to or sell their batteries, as well as cost benefit analysis. Such incentives or disincentives and cost benefit analysis may be provided by the system. Incentives or disincentives may also be provided by the community. There may be, for example, efficiency penalties, or certain types of credits may be given to users who do not contribute to waste stream. In its effort to provide incentives or disincentives, the system may factor in the pricing on the age of the technology of the battery, the actual cost of driving the electric vehicle, disposing costs, the cost of materials, the cost for building new batteries or technology, or the cost of disposing of old (or outdated) batteries or technology just to name a few. Another example would be associating the electric vehicle and/or battery with a core charge. A core charge may be a cost implemented when returning/exchanging a battery. Such cost may be associated with the charge left on a battery, the remaining life of a battery, the quality of the battery, the chemistry making up the battery, and the recycling of the battery. A way in which the core charge may work is that a user purchases an electric vehicle with a battery. The user may pay a certain amount of money for the battery, and a percentage of this amount may be given back to the user whenever he or she brings the battery in for an exchange. The user may bring the battery in within any amount of time, i.e. any number of days, months, and/or years. The amount of money given back to the user may depend on the condition of the battery, or any of the aforementioned factors.

Some embodiments may provide incentives for users to drive battery powered vehicles. Such incentives may include, but are not limited to, toll discounts/incentives, parking discounts/incentives, electric vehicle discounts/incentives.

In some embodiments, any of the network, system, and electric vehicles may provide some controls, restrictions, or the like. Such controls may include, but are not limited to, parental controls, energy limits, distance limits, criminal restrictions on distance, civil restrictions on distance, and theft deterrence. Regarding parent controls, the electric vehicle may be set to only be able to charge for a specific distance (for example, ten miles), time (for example, one hour), or time interval (for example, between 4 PM and 8 PM). Such customizable controls may be beneficial to a user who wishes his or her child to drive, for example, to the grocery store and back without any other stops or detours. Regarding criminal restrictions, the electric vehicle may be set to act as an ankle bracelet would. For example, if a user is court ordered to stay within a town's limits, the electric vehicle may stop automatically once those limits are crossed. Further, if there is a court order to stay at least a certain distance from an ex-spouse's house, the electric vehicle may be programmed to stop once those boundaries are crossed. Regarding theft deterrence, an electric vehicle may be programmed to be un-chargeable without the specific consent of the vehicle's owner. The owner may further be able to cut-off power to the vehicle once he or she learns the electric vehicle has been stolen. Such may be accomplished through the network and system sending a signal to the stolen electric vehicle to shut-off power and not re-start without owner's consent. Such control features may further be applied to rental vehicles. For example, if the rental contract does not allow user to take the vehicle out of a geographic area, the vehicle may be programmed to shut-off once those set boundaries are crossed. It is to be understood by those of ordinary skill that all variations and customizations of such controls are considered to be within the scope of the present disclosure.

In some embodiments, a user may configure his or her vehicle to serve as a ferrying vehicle. The user, for example, may charge one or more batteries at home, off-peak, or using any type of power generation. The user may then deliver the charged batteries to other users, businesses, or the like. The user's ferrying vehicle may in turn be charged by any of the aforementioned methods, including by a charging vehicle and/or a generator.

Some embodiments may employ a social networking website, or the like, which may be concerned with, for example, the preserving of the environment. Such website may be created by an organization or by any user. The users committed to such cause may receive reduced prices, bonuses, special promotions, or the like. For example, users committed to wind power may get a reduced price on wind energy, or they may pay a certain price to ensure that they only receive wind energy. Similarly, users may only want to purchase batteries charged by a certain type of energy, for example, biodiesel.

Cooking oil may be converted to usable energy in the form of biodiesel, and thus used to run generators. Such generators may be used to power an unlimited number of components and/or facilities, for example a restaurant. The cooking oil used in the restaurant may be cycled through and converted to biodiesel energy, which in turn is used to provide power to the restaurant. The biodiesel energy may also be sold to patrons, patrons' electric vehicles, or incorporated into batteries, which may also be further sold. The selling of such energy is not limited to patrons, but may be sold to any other person, facility, or utility grid.

In some embodiments, the electric vehicle may include solar panels to provide some power. Solar panels may be placed on the roof of the electric vehicle, and the vehicle may be charged while parked (i.e. at an airport, in long-term parking), or while the vehicle is idle. Other types of devices may be used to capture solar power such as, but not limited to, mirrors, optical fibers, photovoltaic panels, or the like. Rental electric vehicles, for example, may be charged while idle in the parking lot. In some embodiments, solar power may be used in conjunction with the power from an electric battery to provide power to a vehicle.

Different types of renewable energy may be used to provide power to a vehicle. The on-peak and off-peak times may vary depending on the renewable energy and the weather conditions. For wind power, for example, the on-peak and off-peak times may vary depending on the speed of the wind and the amount of wind present.

In some embodiments the network may monitor the grid, thereby managing the load of electricity used. Managing historical data usage, for example, may filter out energy spikes in the system, thereby leveling the load of energy on the grid. The network and system may distribute energy storage, thereby decentralizing the load. In terms of distributing the load on the grid, for example, delivery or postal vehicles may prove to be beneficial since such vehicles are generally highly active off-peak, while users are at work. The charging vehicles and/or charging stations may act as reserve capacities thereby keeping the system at peak efficiency. For the network and system to function efficiently, it is preferable, though not required, that it runs at peak efficiency.

As mentioned throughout, energy delivery may be dynamic. If needed, a utility company may ask a user to shed his or her energy load in return for a particular discount or promotion. The system, if so desired, may optimize economy of energy over accessibility. If there is a power outage in a neighborhood, the utility company may concentrate some or all of its energy sources to that neighborhood, and may cut some power off somewhere else. A business, for example, may work out a plan with the utility company which allows the company to cut-off, or limit, the power of the business during certain hours, for example between 10 PM and 7 AM. Further, factories or other places of business that require machinery that use a lot of energy may be placed on a specific schedule (monitored by the network and system) to power up each individual machine at specific times, thus not demanding high power from the grid at once. As mentioned throughout, users may sell charge to their employers, companies, or any other facility. Further, peak load may be drawn from electric vehicles, charging vehicles, charging stations, or any of the mentioned sources in order to avoid overloading the utility grid. This dynamic energy delivery system may increase the energy capacities of companies, or other facilities, without having them upgrade their connections to the utility grid. Incorporating such a dynamic system may provide better reliability and in turn more conservation of energy.

Users may also subscribe to the network for various other services such as car rental. Once subscribed, the user, using a key fob or RFID may go to a car rental location and be tracked and monitored by the network. The network may store the individual user's personal preferences which may include the user's preferred charge, type of battery, color of vehicle, type of vehicle, or any other preference. In some embodiments the network may also be linked to carbon trading or emissions trading. The system may determine the carbon footprint for charging, selling charge, or the like, and could further use carbon to add to the "true cost" of a charge. In some embodiments the network may aid in building a market for energy. Through the network, users may be able to create and maintain an account with the utility companies selling various types of energy. Users may use such an account and the network to purchase hydroelectricity, wind energy, or the like.

In some embodiments in case of power outages, a disaster planning system may be set into place. Since it is preferable for the network and system to keep on running during a power outage, generators may be used. Similarly, the network and system may already have a distributed network of power which is to go into effect in case of an outage. Another way of keeping the network and system running is by receiving power from the electric vehicles and/or the charging vehicles. Other critical services, such as, but not limited to, traffic lights, may also be supplied with power during an outage to provide safety on the roads. During a loss of power, the user's electric vehicle may be used to provide power to user's home, or at least to some of the more essential electrical appliances. Likewise, hospitals may also rely on the charge from vehicles (i.e. the vehicles parked in the hospital's parking lot/garage).

Some embodiments may include an emergency announcement and/or evacuation system. In the event of an emergency, the network and system may keep users informed and up-to-date by sending messages to users' electric vehicles. Messages may include special instructions and evacuation routes in case of a natural disaster, for example. This type of up-to-date information may also be used to update users on traffic situations (i.e. closed ramps or roads, accidents, power failure, traffic light malfunction, or the like), and to further offer up-to-date driving directions with the best available routes. Further, electric vehicles may transmit data from the on-board vehicle control systems giving a real time indication of current road conditions by collecting data from vehicle stability systems such as inertial data, vehicle speed, traction control system data, roadway temperature, and the like. One example may include a vehicle A ahead of a user's vehicle travelling at an unsafe speed over an ice patch of road. The on-board control system of vehicle A may alert the network which may broadcast the hazard to all other network enabled vehicles on the same path. The users of the vehicles following vehicle A may then be presented with a series of warning messages regarding the exact location of the road hazard and may proactively take action to reduce or avoid the hazard by reducing speed or not changing the vehicle's direction until the hazard has passed. Centralized monitoring of road conditions via the network may dispatch de-icing equipment to specific locations and potentially reduce the overall effort to keep roads clear and passable by addressing specific trouble areas.

The above descriptions may not only apply to a user's personal electric vehicle, but to other vehicles (i.e. transportation vehicles, carrier vehicles, fleet vehicles, rental vehicles, public transportation vehicles, commercial vehicles, postal vehicles, and the like) as well. Various transportation vehicles, such as trucks, may use any of the embodiments described above to charge and/or operate. For example, at a truck stop, one truck may run at peak efficiency and offer charge and/or heat to the other trucks. Trucks at a truck stop may be running idle in order to provide a desired temperature within the vehicle's cabin, so the drivers (i.e. users of the trucks) may comfortably rest or so that climate-controlled cargo may be managed. The trucks may be kept warm or cool or at a comfortable temperature (depending on the season) using the charge from one truck, or generator, running at peak efficiency. Further, there may also be other Auxiliary Power Units (herein referred to as APU) (i.e. generators, radiators, or the like) which may share the load of heating (or cooling) the vehicles at the truck stop. Because APUs have low transmission losses, they may be efficient in terms of distributing power.

Essentially any electric power source or anything with power-producing capability may serve as an APU. For example, an electric vehicle may serve as an APU to power up a home, thus giving the vehicle almost everything needed to power up the home. Railroad locomotives, for example, may also serve as APUs. Turning a locomotive off and then back on may be costly. Therefore, it may be efficient for the locomotive to provide power to the network and heat to vehicles and/or facilities while idling. Therefore, through the network, trains may sell charge from the locomotive.

Fleet vehicles such as rental cars, service vehicles, delivery vehicles, postal vehicles, public safety vehicles, taxi vehicles, and the like, may be used to sell charge to the network or to other vehicles. For example, rental cars (and school buses) generally sit parked at a site. When not in use, such vehicles may be used to sell charge to the network, to a facility (i.e. shopping mall, hospital, schools, etc.), to a charging vehicle, or to any other vehicle. Rental cars and school buses may be beneficial for battery capacity to the power grid. In fact, any type of vehicle that spends a lot of time being idle may be used to sell charge or power up certain facilities. A vehicle may also provide charge to another vehicle regardless of how long it is idle. A first example may be when parents are waiting to pick up their children from school. Sometimes the parents may be waiting outside (i.e. idle) in their respective vehicles for twenty minutes, or even longer. This provides ample time to sell charge to other vehicles or to the school or any other facility. A second example involves when vehicles are sitting idle in traffic, at traffic lights, railroad or bridge crossings, or the like. During such idle time, vehicles may sell charge to another vehicle or to a facility. A third example may include idle vehicles parked at a train, subway, or metro station. Such idle vehicles may sell charge to the train, to the station, to each other, and the like. Trains that transport vehicles, for example, may purchase charge from the idle vehicles. Having a train transport a user's vehicle to user's desired location may be more efficient than if the user were to drive his or her vehicle directly. Not only may user sell charge during the trip, but the user does not have to worry about weather conditions, traffic jams, or the like. In an effort to make such travel even more efficient, vehicles may be placed onto the train car based on their individual destinations. Alternatively an idle vehicle may also purchase charge from another vehicle, train, or facility. For example, in a commuter ferry or vehicle train ("commuter ferry" and "vehicle train" are used interchangeably throughout the disclosure), the ferry car is part of the train. The ferry car may use its traction motors to pick up power while being dragged by the train, in order to charge the vehicles for the loss of energy. The vehicles may then further be charged by energy from the train's locomotive. Note, a locomotive may give off energy while running, which is usually wasted energy. The locomotives may thus charge batteries for sale or may transfer energy to the electric vehicles. Such energy may be used to heat and/or de-ice the vehicle, or the like. Note, a train may be able to cycle charge from vehicle to locomotive to another vehicle. More specifically, the train may purchase charge from electric vehicle A. Such charge may be used to operate the train as well as used to sell the charge to another electric vehicle B. Similarly, vehicle A may also sell charge to vehicle B directly and choose not to sell to the train, or simultaneously sell charge to both the train and vehicle B.

Figure 10A:
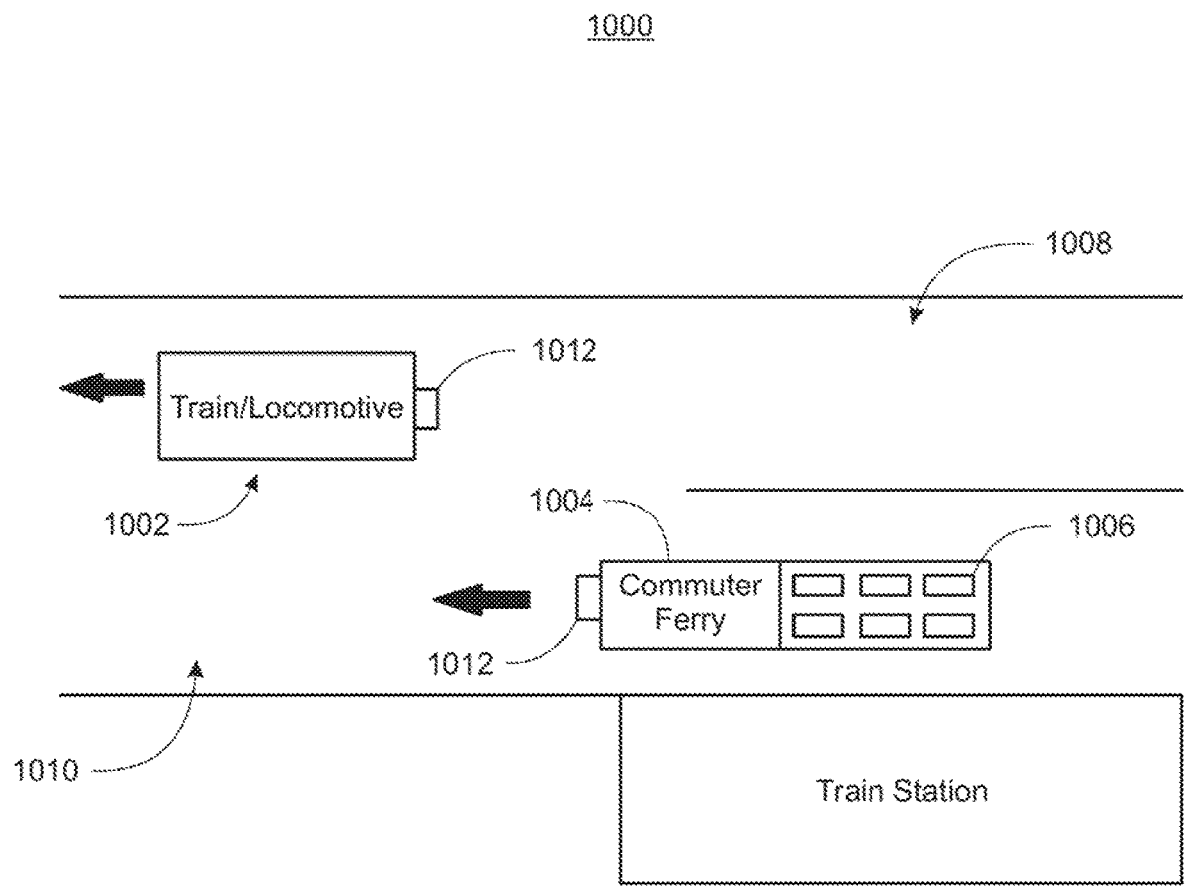
FIGS. 10A and 10B illustrate some embodiments of a train transport.
Figure 10B:
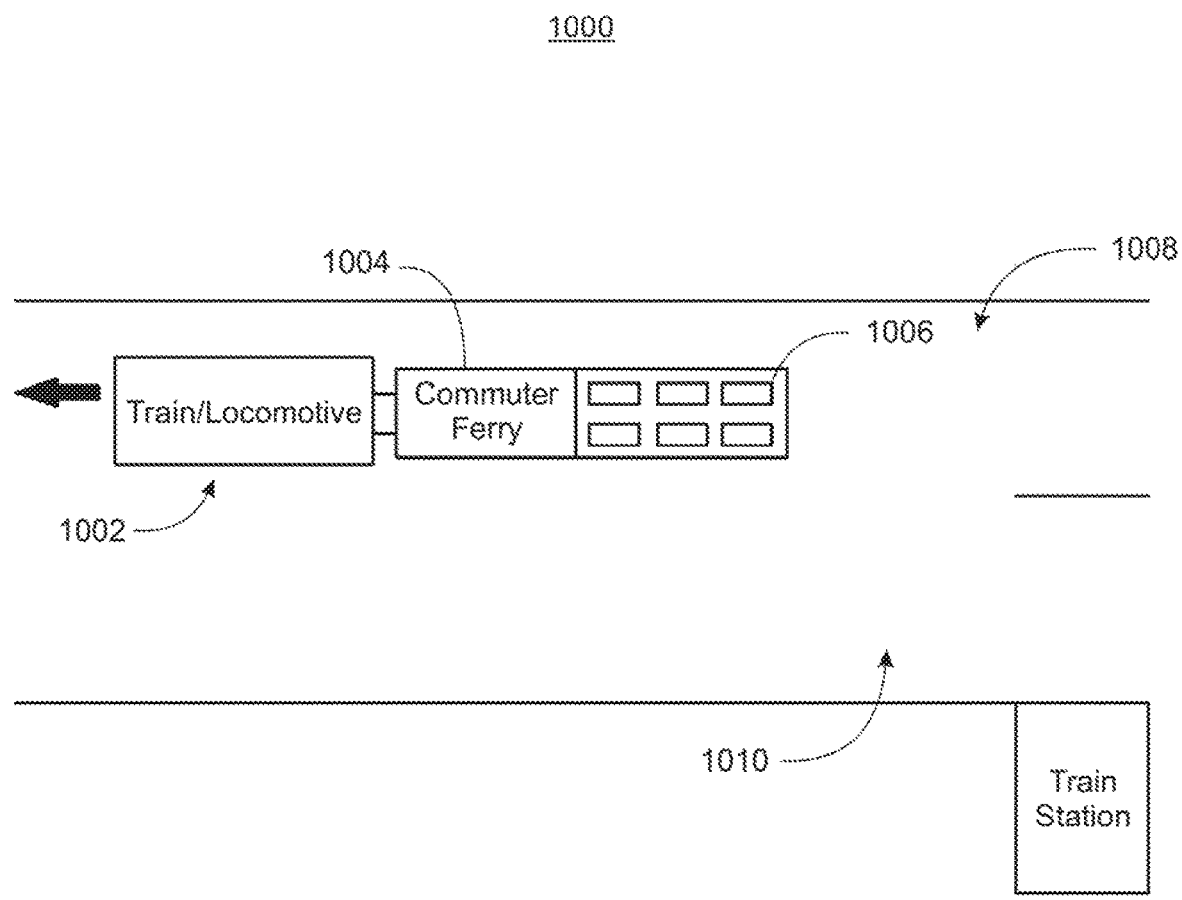

FIGS. 10A and 10B illustrate an example of a train transport 1000. In some embodiments, a commuter ferry 1004, or vehicle train 1004, may join or latch on to a train 1002, while the train 1002 is in motion. In order to do so, the ferry 1004 may accelerate to catch-up to the train 1002. Certain energy may be needed to accelerate the ferry 1004 to catch the moving train 1002, energy which may be transferred from the electric vehicles 1006 on the ferry to the ferry. The train 1002 may run on separate train tracks 1008, whereas the ferry 1004 may run on ferry tracks 1010. The ferry 1004 may move on the ferry tracks 1010 in the same direction as and parallel to the train 1002 on the train track 1008. Once the ferry 1004 has caught-up to the train 1002, it may join the train 1002 on the train tracks 1008 via connector 1012. Connector 1012 may be any conventional connector, device, or latch that may successfully link a train to a locomotive, a ferry, another train car, or the like. Once the ferry 1004 is connected to the moving train 1002, the train's locomotive may be used to charge the electric vehicles 1006, ferry 1004, or the like, as mentioned above. Not stopping the train 1002 during this process may prove to be beneficial since it takes away the deceleration and acceleration of the train 1002, both of which may consume sizable energy. Because the train 1002 does not stop, it may be the equivalent of an "express" train, which is more efficient than a "local" train. Another benefit of not stopping the train 1002 is that it cuts down the traveling time for the users as well as avoids traffic, provides less harm to the roads, and the like.

In some embodiments, a commuter ferry, or vehicle train, may be comprised of a charging vehicle followed by a line of vehicles. The line of vehicles may vary in size from one vehicle to any number of vehicles. The vehicles that make up the ferry may be physically attached to one another, although this is not required. The charging vehicle may be used to lead the line of vehicles and may be used to provide charge to subsequent electric vehicles. In turn, tandem vehicles may offer charge to one another. The commuter ferry may also serve as an efficient way of moving charge from one vehicle to another.

Charging vehicles, stations, or the like may provide more than just battery charge to a vehicle. For example, a charging vehicle may be scheduled through the network to go charge a vehicle at a particular time. While providing this service, the charging vehicle may have some heat coming off the charging process which, instead of being wasted, may be used to heat the passenger compartment or the battery or to de-ice the windows, doors, and locks. A user may, for example, park his or her vehicle in the long-term parking lot at an airport. Upon doing so the user may schedule a charging date which may be thirty minutes before his or her return to the vehicle. The charging vehicle may show up at the scheduled time and charge the user's vehicle after which the charging vehicle may de-ice the windows so that the vehicle is ready to go upon the user's arrival.

In some embodiments, a charging vehicle may be equipped to deliver batteries to users, as well as being equipped to deliver charge for users' electric vehicles batteries. When transporting batteries in the charging vehicle, the batteries may be kept warm by a chemical warmer to ensure proper operability. Similarly, at charging stations, batteries may also be kept warm by a chemical warmer.

In some embodiments, the network and system may also be used for vehicle maintenance issues—either planned or unplanned. User may be notified when there is an issue with the vehicle or charging vehicle or station. User may schedule service, or in the event of an unplanned need for service, the network and GPS information may be used to dispatch a service vehicle to user's electric vehicle. The charging vehicle or charging station may have the ability to test, diagnose, and potentially correct issues with the user electric vehicle as part of the charging transaction.

Figure 11:
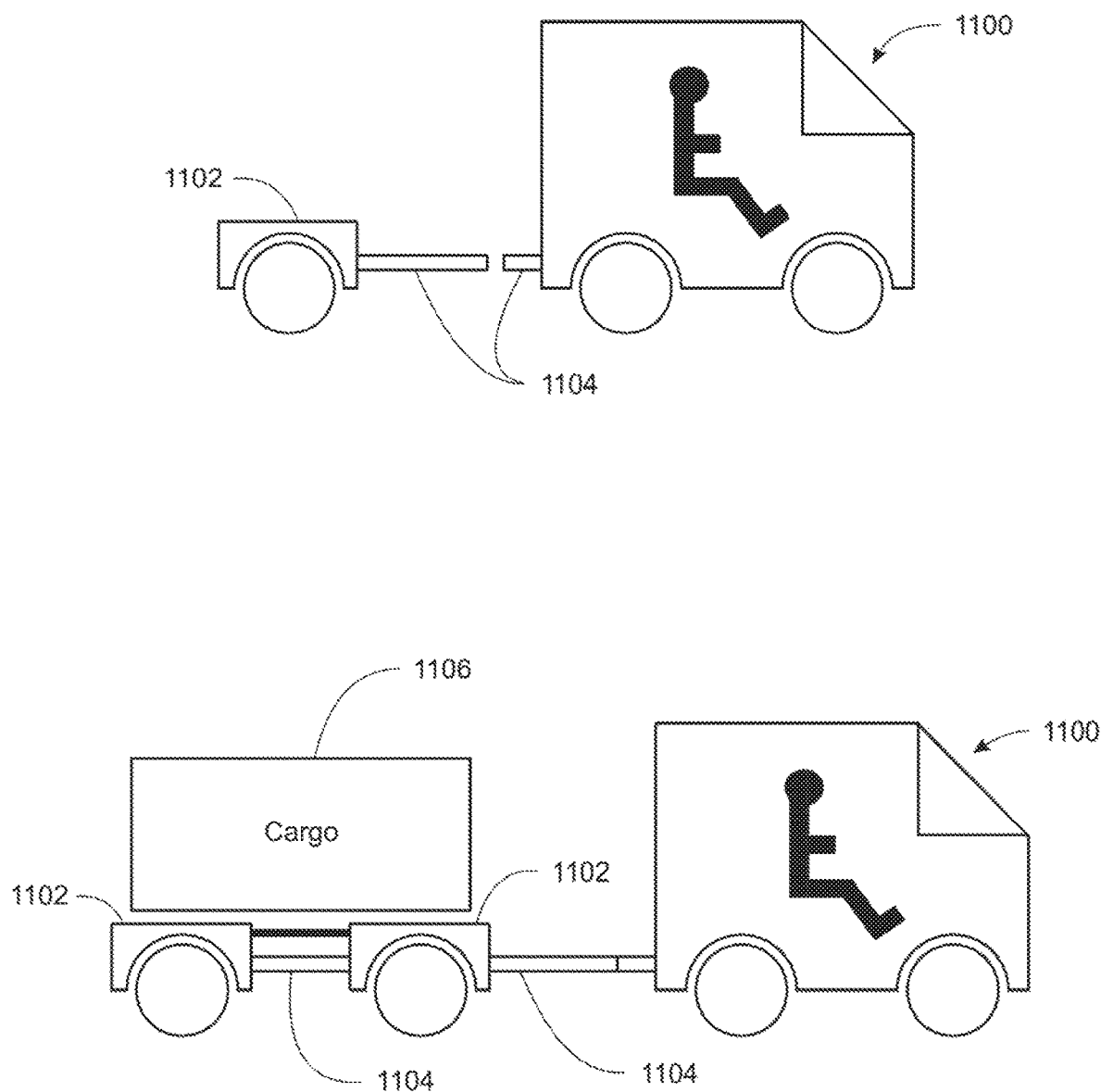
FIG. 11 illustrates an embodiment of a towable vehicle.

FIG. 11 illustrates one, but not all, examples of some embodiments in which a user may desire additional cargo capacity (i.e. wanting to haul something heavy, like top soil, a television, a couch, or the like) for the electric vehicle 1100. Additional load of heavy cargo may tax power and braking systems significantly, and the electric vehicle performance and safety may suffer as a result. The user may find it useful to use a modular concept that allows the attaching and disconnecting of additional cargo capacity, without affecting the vehicle power and braking systems, as well as the overall vehicle safety. In such a case, a user may use a towable vehicle 1102, wagon, cart, caisson, or the like which contains a mix of auxiliary batteries, supplemental traction motors, and power control systems. The towable vehicle 1102 may function as a supplement to the master control system in the user's electric vehicle 1100, and the connection 1104 between the towable vehicle 1102 and the electric vehicle 1100 may be a combination of one or more of a mechanical coupling, electrical system, and vehicle control system. In the event user desires more cargo capacity, he or she may add an additional towable vehicle 1102 and thus turn the electric vehicle 1100 into an electric micro-pickup vehicle allowing a user to carry large and bulky items 1106.

In some embodiments, the towable vehicle 1102 may be used for extending the range of the electric vehicle 1100. For example, the towable vehicle may be battery powered, may serve as an APU, Stirling engine, or the like.

In some embodiments, in the event the towable vehicle becomes accidentally disconnected from the electric vehicle, user may have sufficient control systems on-board to safely decelerate the towable vehicle, and may use the network to alert a central dispatch center of the potential road hazard. The central dispatch center, in turn, may alert other vehicles of the hazard.

In some embodiments, the towable vehicle may be used for driving in foul weather conditions. The towable vehicle may be outfitted with snow tires or studded tires to enhance vehicle traction, stability, and safety. For example, if a winter storm was forecast, a user may either connect a personal towable vehicle or rent a towable vehicle in anticipation of the storm. This may help reduce the use of all-wheel drive on an electric vehicle, which may only be needed in foul weather conditions, but which may take a substantial amount of power to run.

Figure 12:
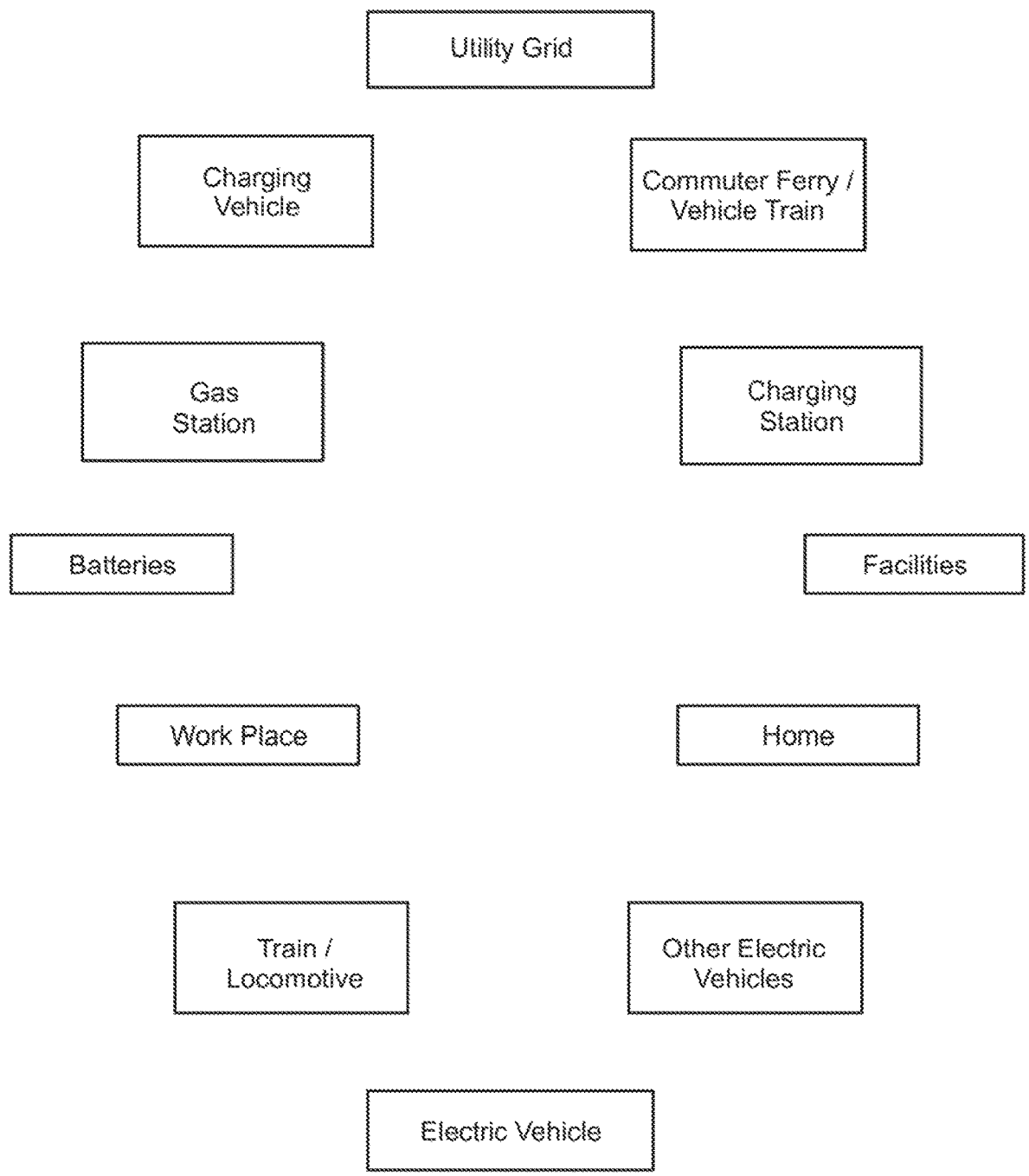
FIG. 12 illustrates some embodiments of the transfer of energy between various mediums.

FIG. 12 illustrates some, but not all, examples of the transfer of energy between various mediums 1200. As noted throughout the disclosure, energy may be transferred between any one or more of the mediums, included, but not limited to a utility grid, a commuter ferry or vehicle train, a charging station, any type of facility, a user's home, an electric vehicle, other electric vehicles, train and/or locomotive, work place, any type of battery, a gas station, or a charging vehicle. In other words, any one or more of the mediums may transfer energy (either partially or fully) to any one or more of the other mediums, which includes transferring to multiple mediums at substantially the same time. For example, a charging vehicle may transfer energy simultaneously to an electric vehicle, a utility grid, and a work place. Similarly, the electric vehicle being charged may also be transferring energy to a user's home and another electric vehicle. Thus, all possibilities and combinations of energy transfer are considered to be within the scope of this disclosure.

Battery Pack Safety Hazard Mitigation

In batteries with high energy density, a safety hazard may occur due to damage inflicted on, or due to a fault, such as a short circuit, inside one or more of the battery's cells. Damage to a cell may result in overheating or emission of smoke and/or flame from the cell. The corresponding high temperature may cause cells in the neighborhood of the damaged cell to overheat and emit smoke and/or flame, and this condition may propagate to all other cells in the battery pack. In large battery packs, such as for electric vehicles, the safety hazard may be great because of the size of the fire that may result.

A battery pack includes one cell or a plurality of cells, a detection system that monitors each cell, and a mitigation system. The mitigation system includes a pressurized container of fluid, a delivery system, and one or more vent(s). The fluid may be capable of suppressing fire. In some embodiments, the delivery system includes a distribution manifold, a control valve and a channel corresponding to each cell for delivery of the pressurized fluid from the manifold to the cell such that the fluid floods the interior of the cell when the detection system detects a condition that is considered likely to result in a safety hazard. The channel may pass through the cell case or may direct the fluid at the exterior of the case in a manner that allows the fluid to pierce the cell case. The fluid floods the cell with sufficient power to force active material from the cell and out of the pack through a vent, thereby reducing the safety hazard. In some embodiments, the container may be pressurized at the time of delivery by energizing a gas generator, and no valve may be needed.

Variations include a battery pack comprised of series-connected groups of cells, which may include groups of parallel-connected cells, a detection system that monitors groups of cells and a delivery system with channels, each of which serves a group of cells, multiple valves, gas generators, and/or channels per cell, or group of cells.

Embodiments for Vehicle Charge

In some embodiments of the charging device, the charging device includes batteries for providing energy to the vehicle to charge the battery. The charging device includes a very low impedance battery. The charging device, which may be referred to as a "battery charger", in some embodiments, is in the form of a device or pod. The pod or charging device includes a number of battery cells. The battery charger battery is itself charged from an electric source such as connection to an electric utility grid or a generator. In some embodiments, the charger is connected to an electric utility grid and the battery charger is charged during off peak hours. In some embodiments, the charger is connected to a generator, and in some embodiments the generator is a Stirling machine.

In some embodiments, the battery in the charging device has a higher potential than the battery in the electric vehicle. The charging device contains a battery which may be directly coupled to the electric vehicle battery via a switch, or the like. The potential difference between the battery in the charging device and the battery in the electric vehicle causes the charge to flow from the charging device to the electric vehicle. The charging device may have enough information about the electric vehicle battery in order to be able to determine if the electric vehicle battery is due for a charge. In this situation there may be no need for a converter in the conduction path, although one may be used in some embodiments. The impedance of the two batteries, when connected, is low enough to provide sufficient charging power, yet high enough to avoid excessive charging power. An acceptable rate of charge is achieved by the combination of the potential difference between the battery in the charging device and the battery in the electric vehicle, and the total impedance of the two batteries. In some embodiments, a power converter may be used to transfer energy between batteries at different potentials.

In some embodiments, the charger battery cells are in parallel. To charge the vehicle battery, the charger battery's cells go from being in parallel to being in series. In some embodiments, less than all of the cells switch from parallel to series to charge the vehicle battery. Thus, in these embodiments, the number of cells used to charge the vehicle battery may be controlled and in some cases, not all of the cells are used. In these embodiments, the charger battery will put enough cells in series so that the potential of the charging device is slightly higher than the vehicle battery. However, in some embodiments, all of the cells may be used to charge the vehicle battery.

In some embodiments, the electrical connection between the vehicle battery and the charger battery is a plug. In some embodiments, the vehicle battery includes a copper bus and the charger battery plug is screwed onto the copper bus. This provides an insulated and efficient electrical connection.

Some embodiments of the method include a charger station including at least one battery charger apparatus or pod. The charger station may provide communication to a vehicle via satellite or other communication networks, etc., to indicate whether the charger station includes charged pods. In some embodiments, all of the pods may communicate with a central database indicating their charge status. The database may communicate with the vehicle to indicate which pods may be able to provide enough charge and the location of the pods, i.e., the charger station location.

A first vehicle battery may also provide a charge to a second vehicle battery. The first vehicle battery may include a controller to control the percentage of charge the first vehicle battery is giving to the second vehicle battery. The charge is given through an electrical connection. In some embodiments, this electrical connection is similar to the connection between the battery charger and the vehicle battery.

In some embodiments, either one or more batteries in the charging vehicle/charging device/battery charger may be charged by a satellite and/or the one or more vehicle battery may be charged by a satellite.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A method for transferring electric energy from an electric vehicle to an infrastructure comprising:
    coupling the electric vehicle to an electrical transfer interface;
    specifying amount of electricity that may be transferred from a battery to the infrastructure;
    transferring electricity from the battery in the electric vehicle to the infrastructure during peak electric hours wherein the infrastructure uses the electricity from the battery as electric power;
    monitoring the transfer of electricity from the battery wherein total transfer of all of the electricity from the battery is prevented;
    transferring electricity from the infrastructure to the battery of the electric vehicle during off peak hours;
    recharging the battery of the electric vehicle; and
    reducing a parking fee by the amount of electricity that is transferred from the electric vehicle.

2. The method of claim 1, further comprising the electric vehicle and the infrastructure communicating using a network.

3. The method of claim 1, further comprising the electric vehicle authorizing the transfer of electricity from the battery to the infrastructure.

4. The method of claim 1, wherein transferring electricity from the infrastructure to the battery of the electric vehicle during off peak hours further comprising programming the network to transfer the electricity from the infrastructure to the battery of the electric vehicle at a preprogrammed time.

5. The method of claim 1, further comprising determining the amount of electricity available in the battery.

6. The method of claim 1, further comprising decoupling the electric vehicle from the electrical transfer interface.

7. A method for transferring electric energy from an electric vehicle to an infrastructure comprising:
    specifying amount of electricity that may be transferred from a battery to the infrastructure;
    transferring electricity from a battery in the electric vehicle to the infrastructure during peak electric hours wherein the infrastructure uses the electricity from the battery as electric power;
    monitoring the transfer of electricity from the battery wherein total transfer of all of the electricity from the battery is prevented;
    transferring electricity from the infrastructure to the battery of the electric vehicle during off peak hours;
    recharging the battery of the electric vehicle; and
    reducing a parking fee by the amount of electricity that is transferred from the electric vehicle.

8. The method of claim 7, further comprising the electric vehicle and the infrastructure communicating using a network.

9. The method of claim 7, further comprising the electric vehicle authorizing the transfer of electricity from the battery to the infrastructure.

10. The method of claim 7, wherein transferring electricity from the infrastructure to the battery of the electric vehicle during off peak hours further comprising programming the network to transfer the electricity from the infrastructure to the battery of the electric vehicle at a preprogrammed time.

11. The method of claim 7, further comprising determining the amount of electricity available in the battery.

12. The method of claim 7, further comprising coupling the electric vehicle to an electrical transfer interface.

13. The method of claim 12, further comprising decoupling the electric vehicle from the electrical transfer interface.

* * * * *